United States Patent
Taruno et al.

(10) Patent No.: US 10,427,821 B2
(45) Date of Patent: Oct. 1, 2019

(54) DELAMINATED CONTAINER MANUFACTURING METHOD AND AIR LEAK INSPECTION METHOD FOR DELAMINATED CONTAINER

(71) Applicant: KYORAKU CO., LTD., Kyoto (JP)

(72) Inventors: Shinsuke Taruno, Kanagawa (JP); Kousuke Aihara, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 34 days.

(21) Appl. No.: 15/517,585

(22) PCT Filed: Sep. 18, 2015

(86) PCT No.: PCT/JP2015/076770
§ 371 (c)(1),
(2) Date: Apr. 7, 2017

(87) PCT Pub. No.: WO2016/056385
PCT Pub. Date: Apr. 14, 2016

(65) Prior Publication Data
US 2017/0313462 A1    Nov. 2, 2017

(30) Foreign Application Priority Data
Oct. 7, 2014 (JP) .................................. 2014-206680

(51) Int. Cl.
*B32B 43/00* (2006.01)
*B65D 1/02* (2006.01)
(Continued)

(52) U.S. Cl.
CPC ....... *B65D 1/0215* (2013.01); *B65D 83/0055* (2013.01); *G01M 3/26* (2013.01);
(Continued)

(58) Field of Classification Search
CPC ..... B32B 38/10; B32B 43/006; Y10T 156/11; Y10T 156/19; Y10T 156/1142;
(Continued)

(56) References Cited

U.S. PATENT DOCUMENTS 5,885,401 A * 3/1999 Eiban .................. B08B 9/083
134/104.4
6,199,615 B1 * 3/2001 Klarl .................. B08B 9/083
156/706
(Continued)

FOREIGN PATENT DOCUMENTS

JP    H04-267727 A    9/1992
JP    H08-175568 A    7/1996
(Continued)

OTHER PUBLICATIONS

International Search Report dated Nov. 24, 2015 from corresponding International Patent Application No. PCT/JP2015/076770; 2 pgs.

*Primary Examiner* — Mark A Osele
*Assistant Examiner* — Nickolas R Harm
(74) *Attorney, Agent, or Firm* — Maier & Maier, PLLC

(57) ABSTRACT

A method of manufacturing a delaminatable container is provided that is capable of uniformly delaminating the inner bag from the outer shell. According to the first aspect, a container body is formed having an outer shell and an inner bag. The inner bag preliminary delaminated from the outer shell in an entire circumference of a storage portion of the container body by rotating the container body while pressing the storage portion with a pressing mechanism from outside for compression or by moving the pressing mechanism along an outer circumference of the container body.

5 Claims, 21 Drawing Sheets

(51) Int. Cl.
  *G01M 3/26* (2006.01)
  *B65D 83/00* (2006.01)
  *B65D 41/04* (2006.01)
  *B32B 38/10* (2006.01)
  *B65D 35/14* (2006.01)
  *B65D 25/16* (2006.01)
  *B65D 77/06* (2006.01)
  *B65D 77/22* (2006.01)
  *B65D 23/02* (2006.01)
  *B65D 90/02* (2019.01)
  *B29L 31/00* (2006.01)
  *B29C 49/04* (2006.01)
  *B29C 49/22* (2006.01)
  *B29C 49/42* (2006.01)
  *B29L 9/00* (2006.01)

(52) U.S. Cl.
  CPC ............ *B29C 49/04* (2013.01); *B29C 49/22* (2013.01); *B29C 49/4273* (2013.01); *B29L 2009/001* (2013.01); *B29L 2031/7158* (2013.01); *B32B 38/10* (2013.01); *B32B 43/006* (2013.01); *B65D 1/0238* (2013.01); *B65D 1/0246* (2013.01); *B65D 23/02* (2013.01); *B65D 25/16* (2013.01); *B65D 35/14* (2013.01); *B65D 41/0442* (2013.01); *B65D 77/065* (2013.01); *B65D 77/067* (2013.01); *B65D 77/225* (2013.01); *B65D 83/0061* (2013.01); *B65D 90/02* (2013.01); *Y10T 156/11* (2015.01); *Y10T 156/19* (2015.01)

(58) Field of Classification Search
  CPC .......... Y10T 156/1174; Y10T 156/195; Y10T 156/1956; B65D 1/0215; B65D 1/0238; B65D 1/0246; B65D 23/02; B65D 25/16; B65D 35/14; B65D 41/0442; B65D 77/065; B65D 77/067; B65D 77/225; B65D 83/0085; B65D 83/0061; B65D 90/02
  USPC ............... 156/701, 709, 715, 750, 760, 921; 215/12.1, 380; 222/95, 96, 107
  See application file for complete search history.

(56) References Cited

U.S. PATENT DOCUMENTS

| | | | |
|---|---|---|---|
| 6,205,847 | B1 | 3/2001 | Nomoto |
| 6,365,202 | B1* | 4/2002 | Ida .......................... A61J 9/001 215/11.1 |
| 6,959,840 | B2* | 11/2005 | Iwatsubo .............. B05B 11/047 222/130 |
| 2004/0011810 | A1* | 1/2004 | Mita ...................... B65D 35/14 222/105 |
| 2006/0054635 | A1 | 3/2006 | Iwahashi et al. |
| 2009/0174102 | A1 | 7/2009 | Iwahashi et al. |
| 2010/0075001 | A1* | 3/2010 | Succar ............... B65D 47/2018 426/115 |
| 2014/0190992 | A1 | 7/2014 | Kuwagaki et al. |

FOREIGN PATENT DOCUMENTS

| | | |
|---|---|---|
| JP | H09-2529 A | 1/1997 |
| JP | 3303234 B | 6/1999 |
| JP | 2013-035557 A | 2/2013 |
| JP | 2014-28636 A | 2/2014 |
| JP | 2014-213927 A | 11/2014 |
| WO | 99/14569 A1 | 3/1999 |
| WO | 2004/071887 A1 | 8/2004 |

* cited by examiner

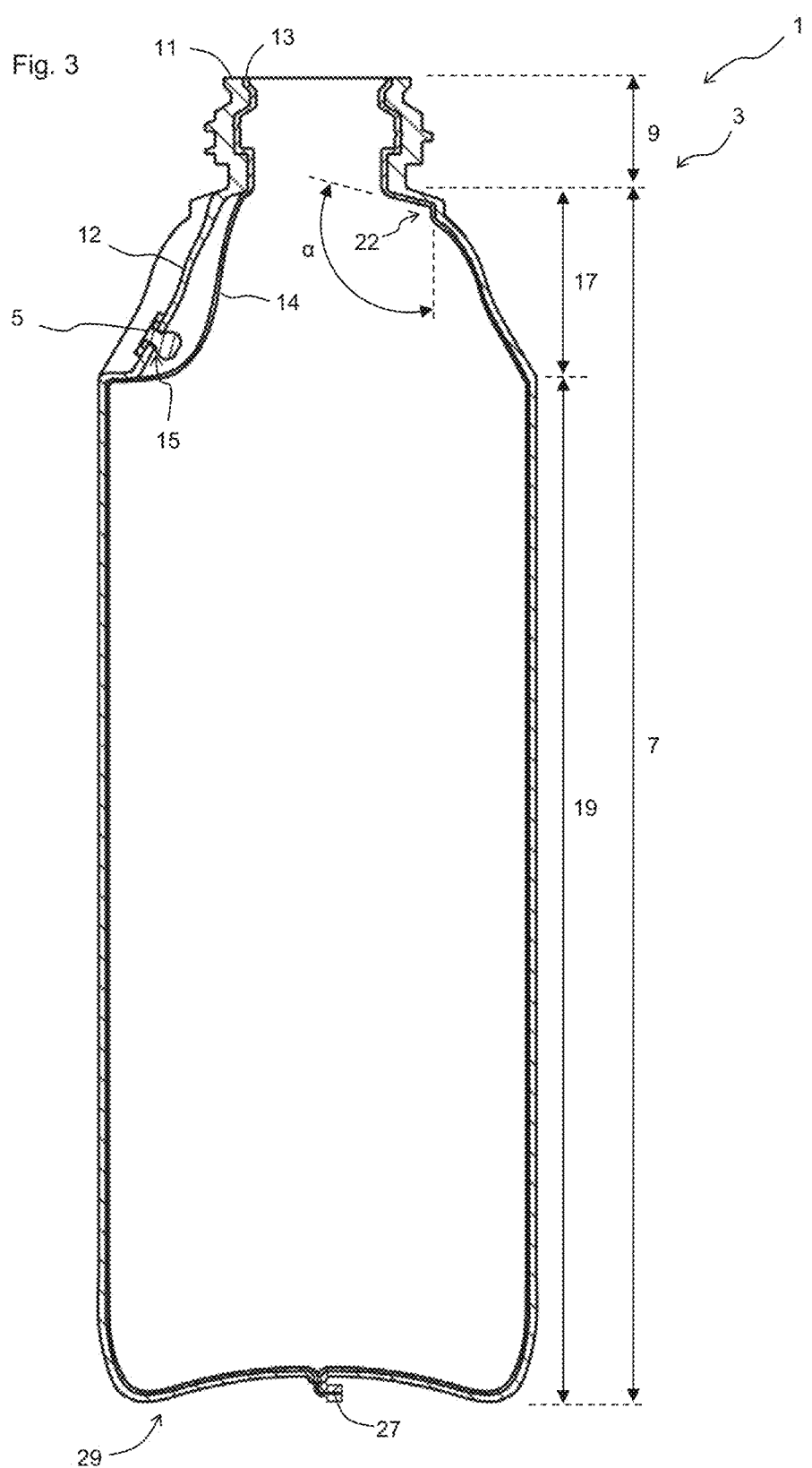

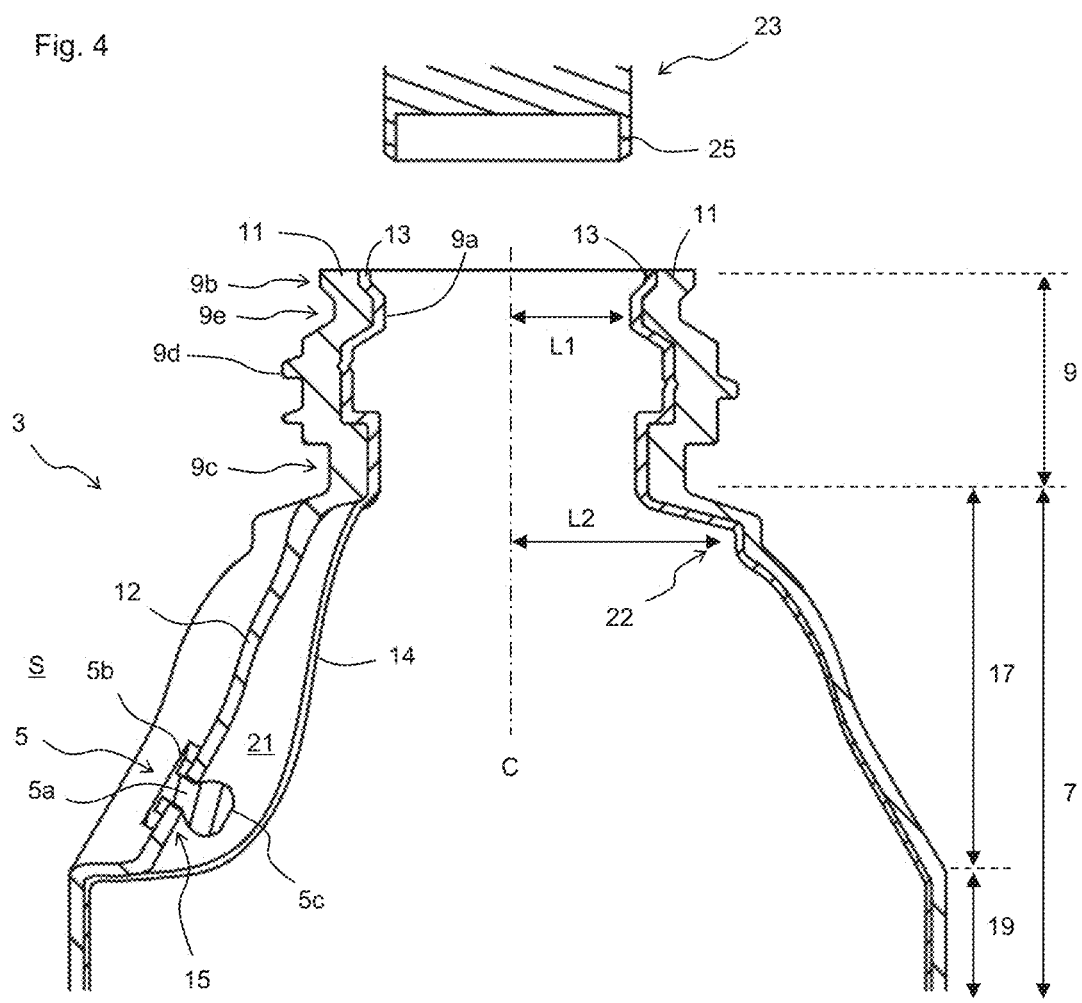

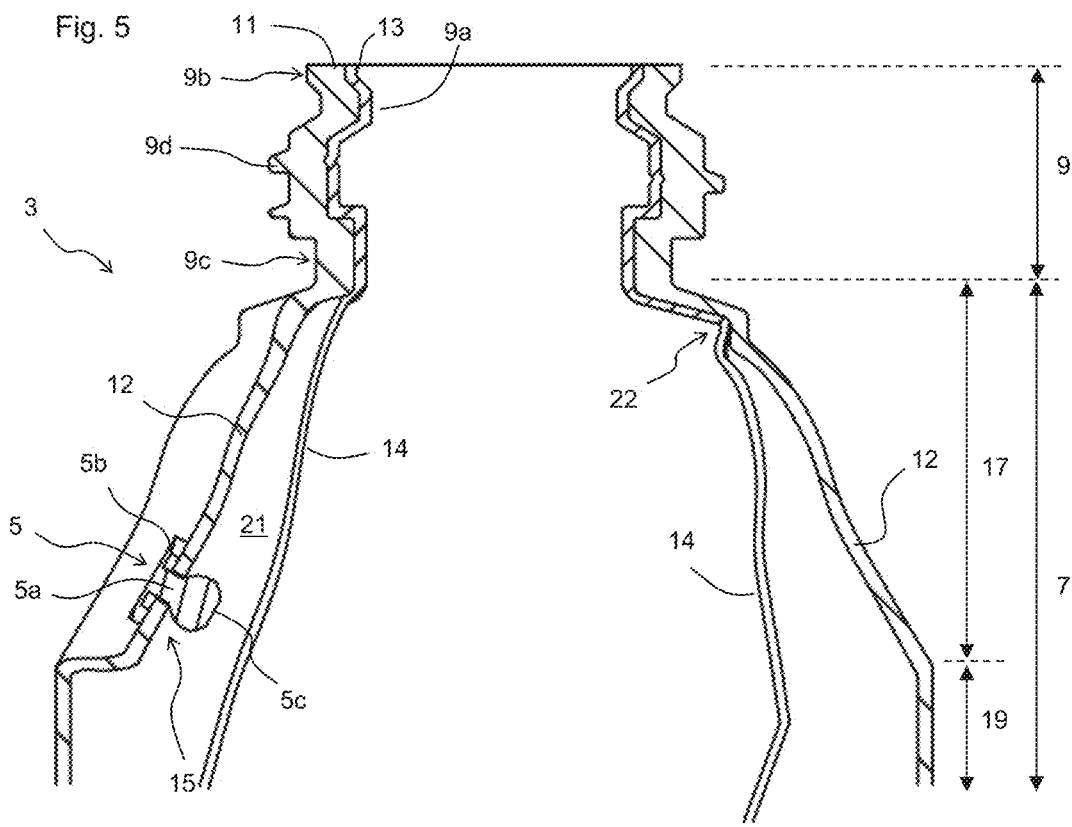

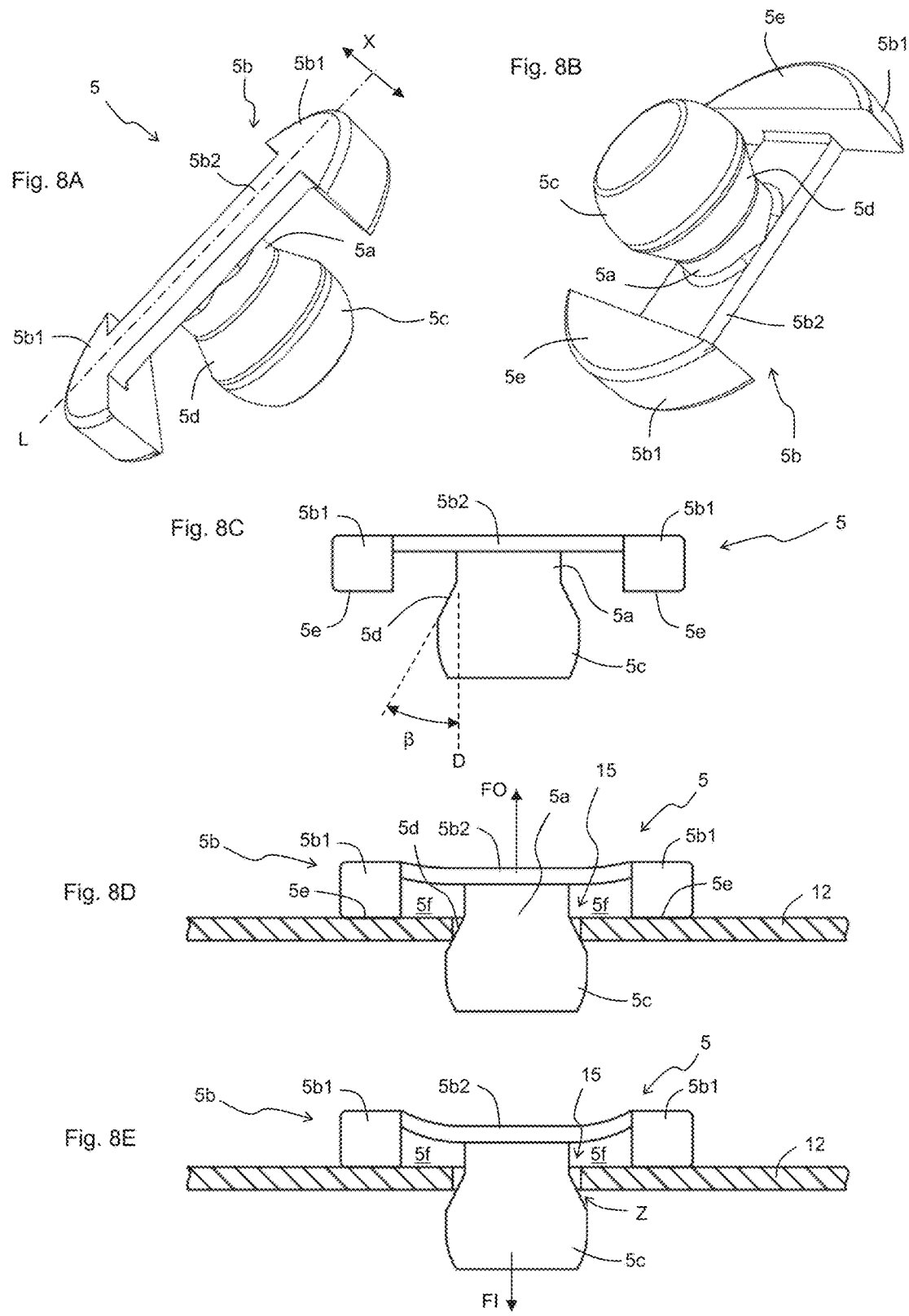

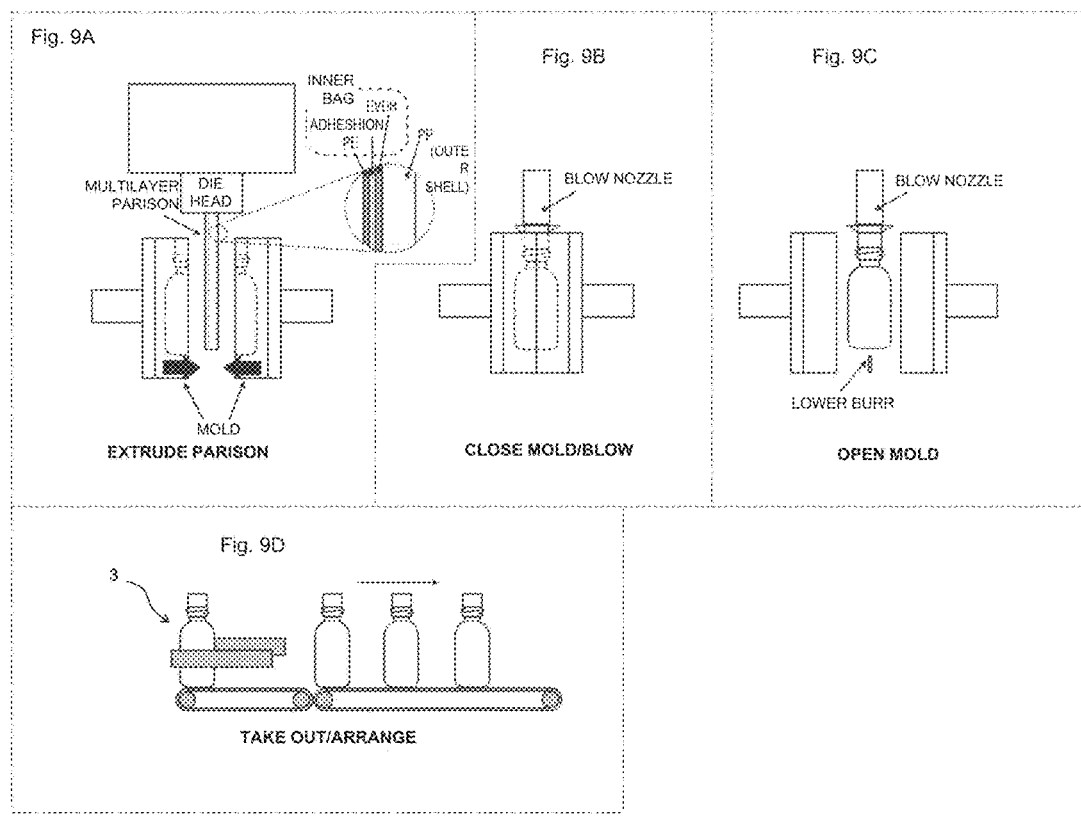

SET CONTAINER

CUT WITH SUCTION

EMIT PIECE BY BLOW

PRELIMINARILY PEEL INNER LAYER

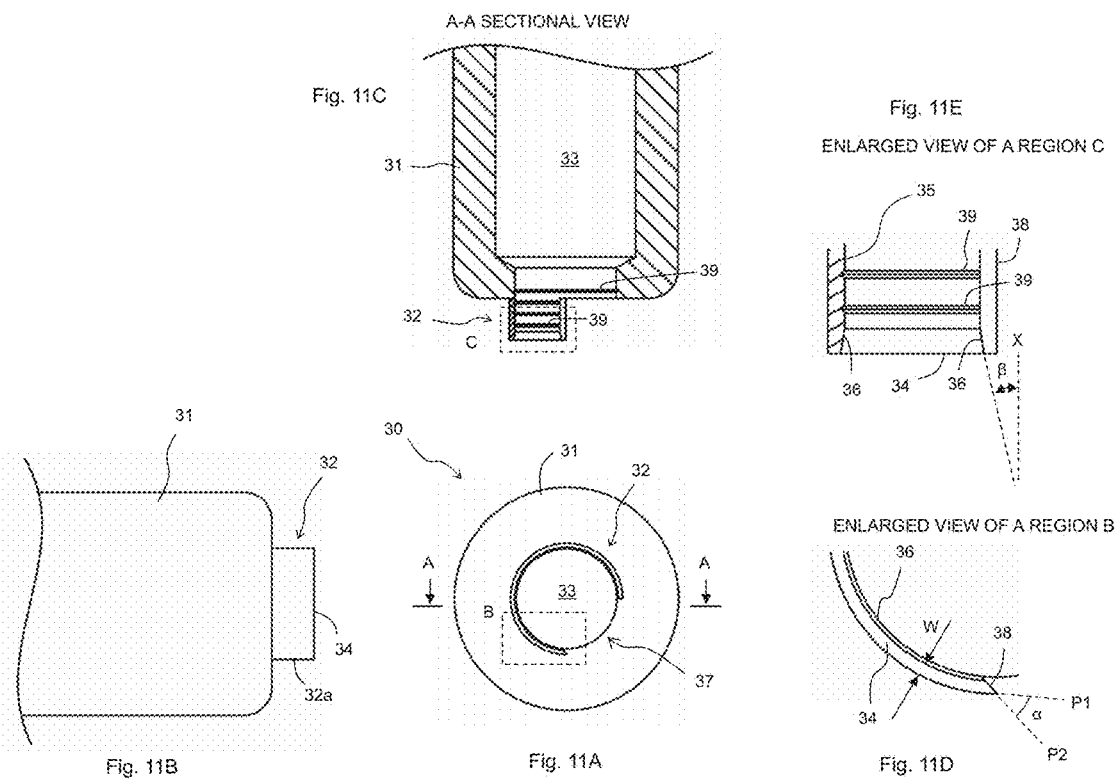

RELIEF PART HOT AIR BENDING STEP

BLOW AIR

CUT UPPER TUBULAR PART

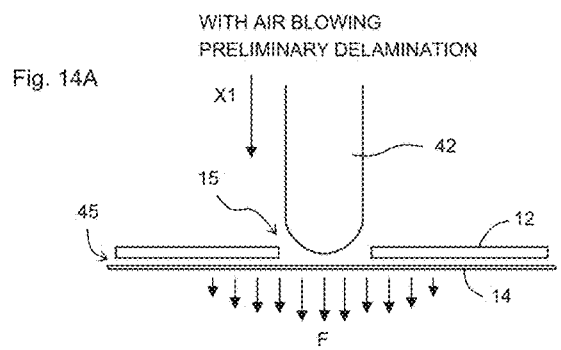
Fig. 14A WITH AIR BLOWING PRELIMINARY DELAMINATION
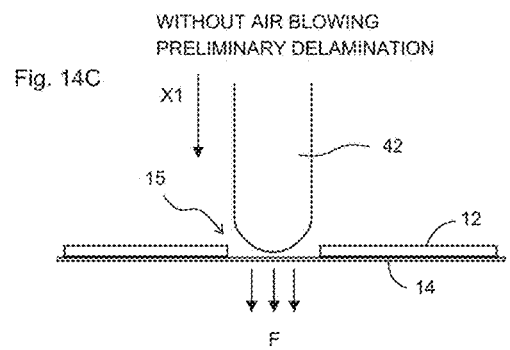
Fig. 14C WITHOUT AIR BLOWING PRELIMINARY DELAMINATION
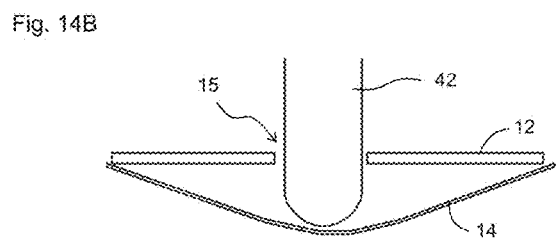
Fig. 14B
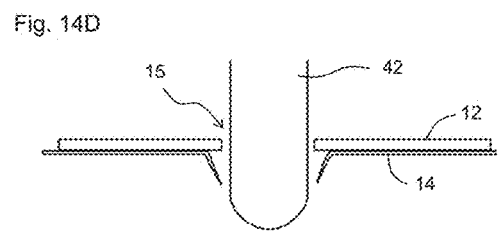
Fig. 14D

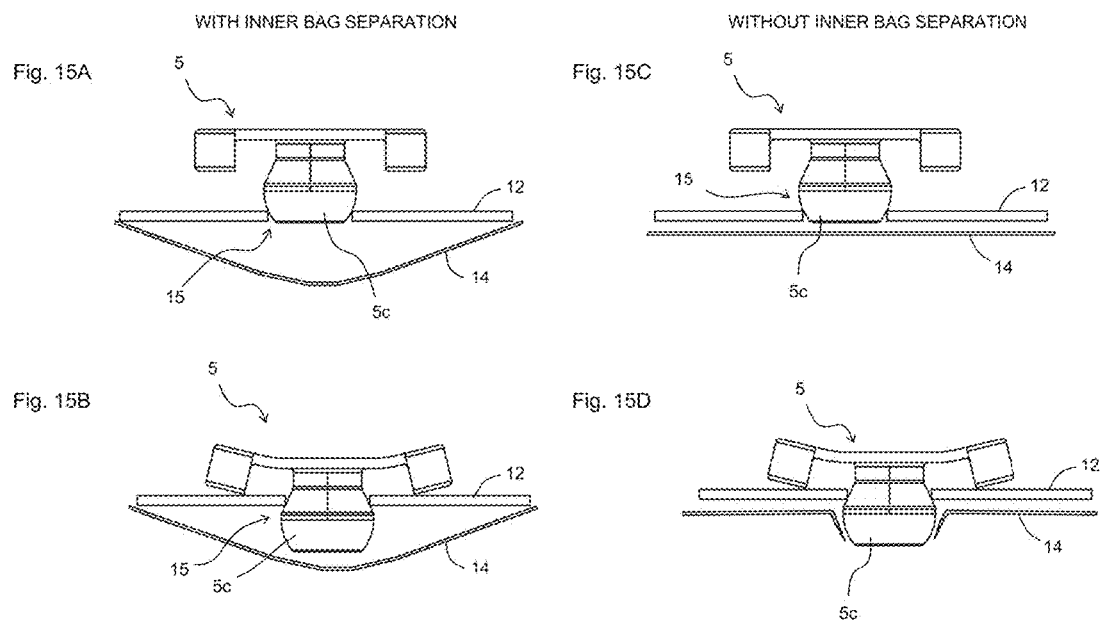

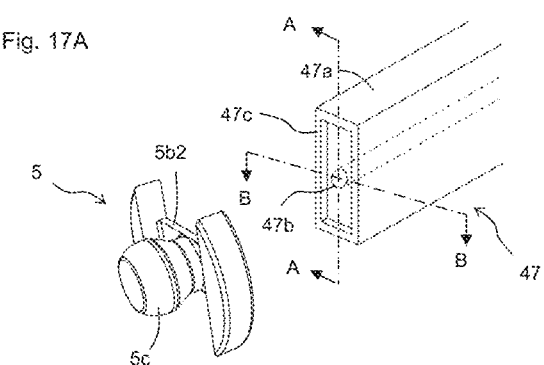
Fig. 17A
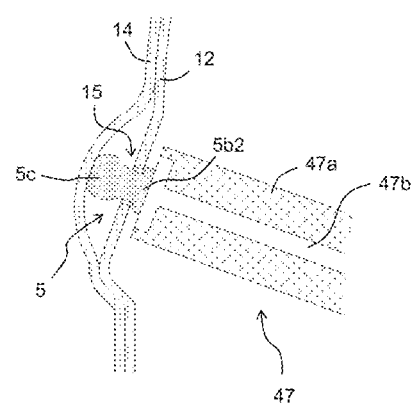
Fig. 17B  A-A SECTIONAL VIEW
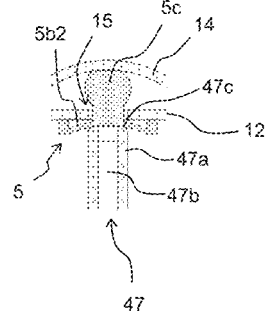
Fig. 17C
A-A SECTIONAL VIEW

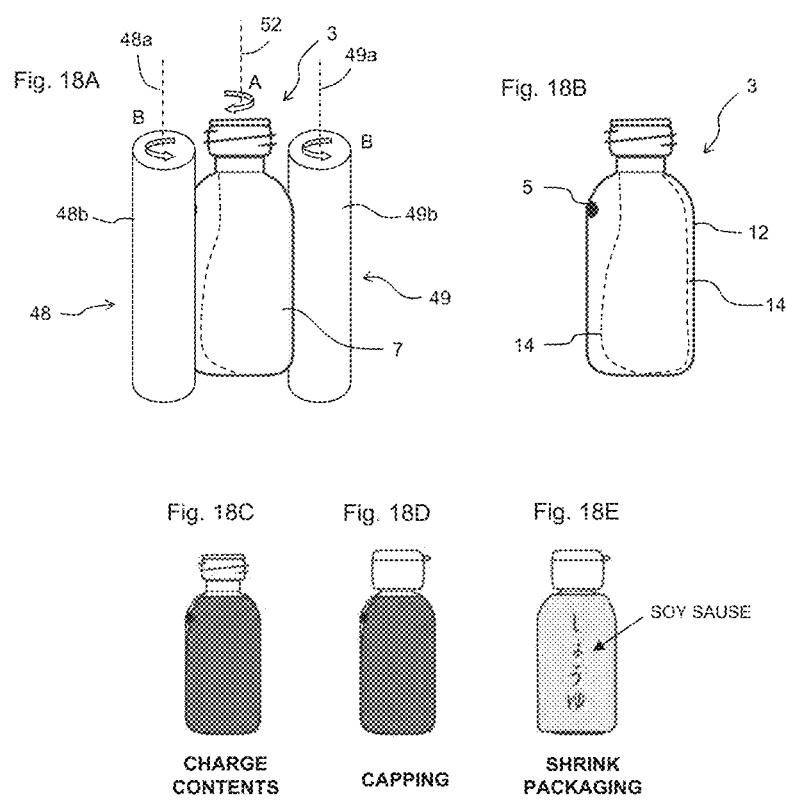

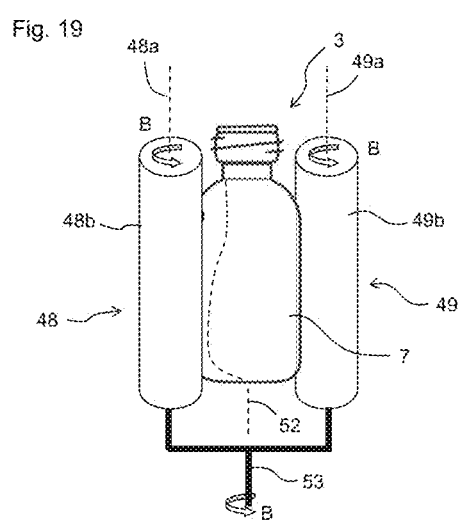

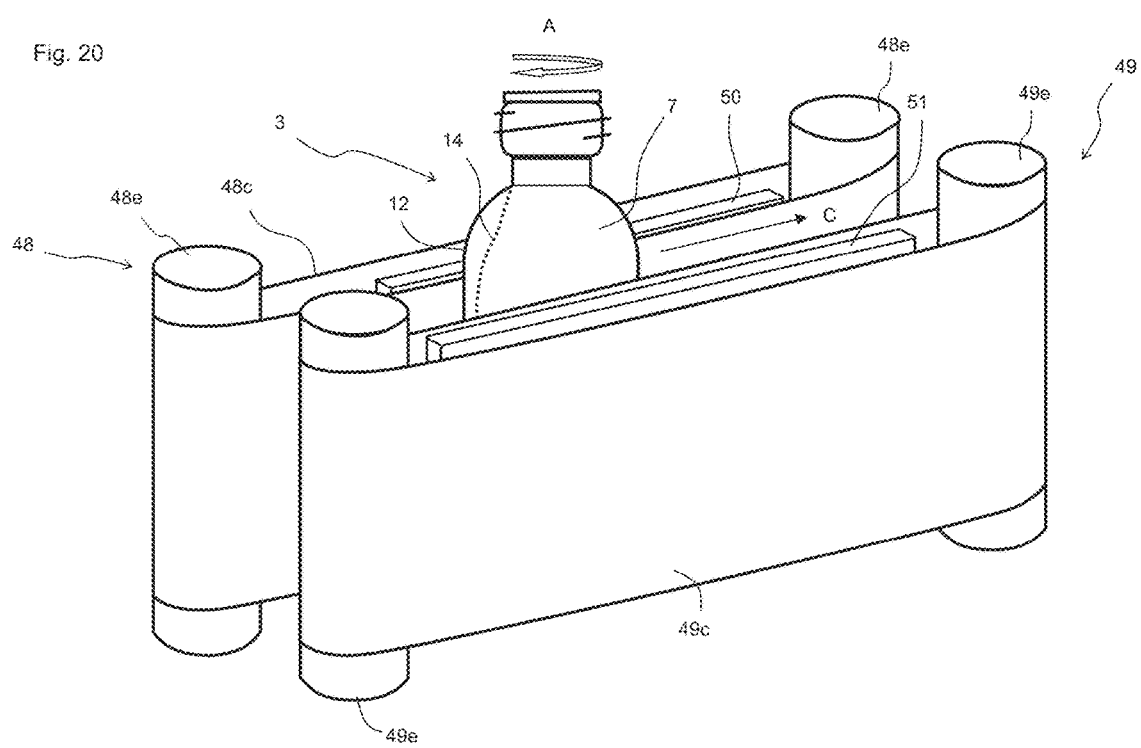

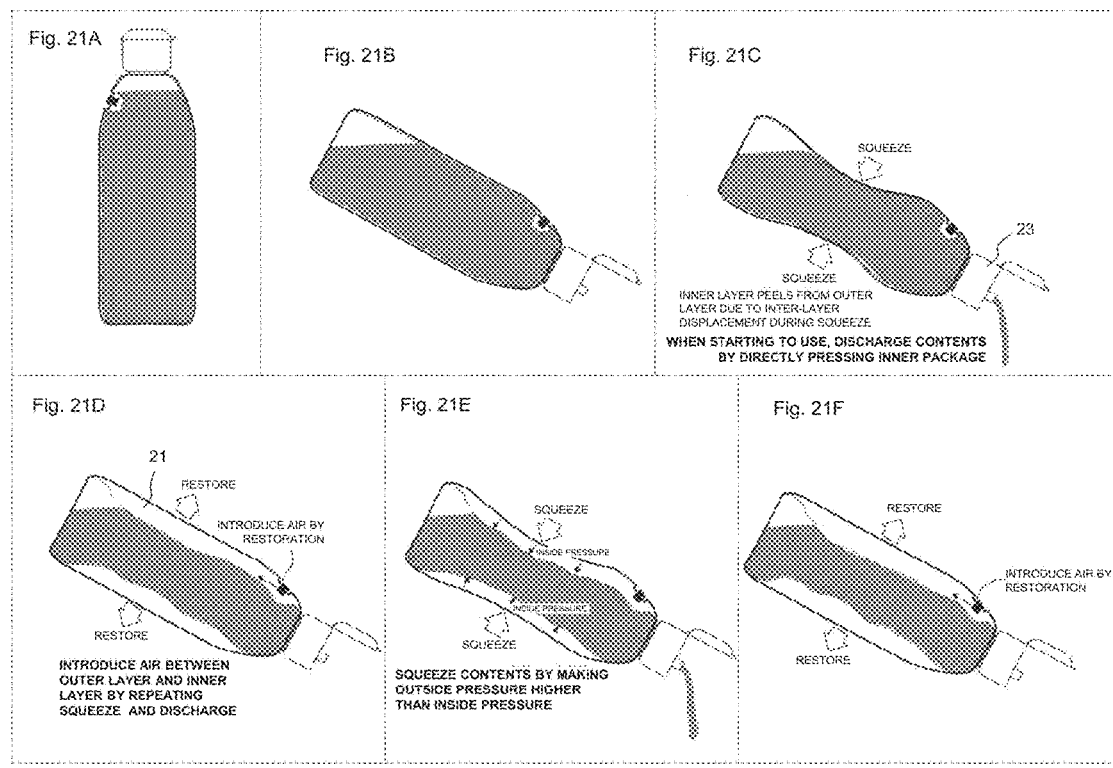

DELAMINATED CONTAINER MANUFACTURING METHOD AND AIR LEAK INSPECTION METHOD FOR DELAMINATED CONTAINER

TECHNICAL FIELD

The present invention relates to a method of manufacturing a delaminatable container and an air leakage inspection method for a delaminatable container.

BACKGROUND ART

Delaminatable containers are conventionally known that include a container body having an outer shell and an inner bag and having the inner bag delaminating, with a decrease in contents, from the outer shell to be shrunk, and a check valve to regulate entrance and exit of air between an external space of the container body and an intermediate space between the outer shell and the inner bag (PTLs 1 and 2). In addition, delaminatable containers are conventionally known that inhibits entrance of air inside the container by delaminating, with a decrease in contents, the inner layer from the outer layer to be shrunk (PTL 3). Such a delaminatable container is provided with an inner bag composed of an inner layer and an outer shell composed of an outer layer.

In PTL 1, a cap mounted to the mouth of the container body has a built-in valve.

In PTL 2, inside the main portion of the outer shell is equipped with a valve.

In PTL 3, the presence of holes in the inner bag is inspected based on whether a pressure in the inner bag reaches a predetermined value at a predetermined time after air is supplied into the inner bag.

CITATION LIST

Patent Literature

PTL 1: JP 2013-35557A
PTL 2: JP 4-267727A
PTL 3: Japanese Patent No. 3303234

SUMMARY OF INVENTION

Technical Problem

First Aspect

In the delaminatable container as above, the delamination strength in delamination of the inner bag from the outer shell is sometimes not uniform across the entire circumference of the inner bag. In such a case, some area of the inner bag is sometimes not separated from the outer shell to shrink the inner bag apart from the outer shell in the remaining region. In this case, there is a problem that the contents of the inner bag are unevenly positioned on some part of the outer shell and the center of gravity of the delaminatable container is off-centered, causing the delaminatable container easily falling down.

The first aspect of the present invention has made in view of such circumstances to provide a method of manufacturing a delaminatable container capable of uniformly delaminating the inner bag from the outer shell.

Second Aspect

In the configuration of PTL 1, a cap structure is complex, leading to an increase in production costs. In the configuration of PTL 2, a troublesome step of bonding a check valve to the inside of the main portion of the outer shell is required, leading to an increase in production costs.

The second aspect of the present invention has made in view of such circumstances to provide a method of manufacturing a delaminatable container excellent in productivity.

Third Aspect

The configuration of PTL 3 is capable of detecting a relatively large hole affecting the pressure in the inner bag, whereas it is difficult to find a hole smaller than that.

The third aspect of the present invention has made in view of such circumstances to provide an air leakage inspection method capable of highly accurately detecting whether there is a pinhole in the inner bag of the delaminatable container.

Solution to Problem

First Aspect

According to the first aspect of the present invention, a method of manufacturing a delaminatable container is provided that includes: container body formation, forming a container body having an outer shell and an inner bag; and entire circumference preliminary delamination, preliminarily delaminating the inner bag from the outer shell in an entire circumference of a storage portion of the container body by rotating the container body while pressing the storage portion with a pressing mechanism from outside for compression or by moving the pressing mechanism along an outer circumference of the container body.

To solve the above problems, the present inventors had an idea that preliminary delamination of the inner bag from the outer shell was required across the entire circumference of the storage portion of the delaminatable container. They have found then that the storage portion of the container body is pressed for compression while the container body and the pressing mechanism are relatively rotated to enable secure preliminary delamination across the entire circumference of the storage portion to have come to complete the first aspect of the present invention.

Various embodiments in the first aspect of the present invention are described below as examples. The embodiments below may be combined with each other.

Preferably, the method further includes, prior to the entire circumference preliminary delamination, air blowing preliminary delamination, preliminarily delaminating the inner bag from the outer shell by blowing air between the outer shell and the inner bag.

Preferably, the pressing mechanism includes first and second pressing elements, each element having a roller, and in the entire circumference preliminary delamination, the storage portion is sandwiched between the roller of the first pressing element and the roller of the second pressing element to be pressed.

Preferably, the pressing mechanism includes first and second pressing elements, each element having a belt, and for the entire circumference preliminary delamination, the storage portion is sandwiched between the belt of the first pressing element and the belt of the second pressing element to press the storage portion for compression while the belt of the first pressing element is moved relatively to the belt of the second pressing element, thereby transferring the container body in one direction while rotating the body.

Preferably, at least one of the belt of the first pressing element and the belt of the second pressing element has a projection and a depression on a surface making contact with the storage portion.

Second Aspect

According to the second aspect of the present invention, a method of manufacturing a delaminatable container is provided that includes: container body formation, forming a container body having an outer shell and an inner bag; fresh air inlet formation, forming a fresh air inlet penetrating only the outer shell in a storage portion of the container body, the storage portion being configured to store contents; preliminary delamination, preliminarily delaminating the inner bag from the outer shell by blowing air between the outer shell and the inner bag; inner bag separation, separating the inner bag from the outer shell by inserting an insertion tool from the fresh air inlet to press the inner bag inside the container body; and valve member mounting, mounting a valve member capable of opening and closing the fresh air inlet to the outer shell, wherein in the valve member mounting, the valve member is mounted to the outer shell by pressing the valve member into the fresh air inlet from outside the outer shell.

The present inventors made an intensive review to allow mounting of a valve member to an outer shell by pressing the valve member into the fresh air inlet of the outer shell from outside the outer shell. According to such configuration, a cap is not required to be equipped with a check valve and the valve member may be readily mounted, allowing a simple structure and high productivity.

Upon a review in further detail, it is found that the valve member sometimes forcibly collides with the inner bag when the valve member is pressed into the fresh air inlet to damage the inner bag.

To take measures against such problems, they have found that the damage in the inner bag is prevented by performing both the preliminary delamination and the inner bag separation prior to the valve member mounting to have come to complete the second aspect of the present invention. When only the preliminary delamination is performed without performing the inner bag separation, a gap between the inner bag and the outer shell sometimes does not sufficiently extend near the fresh air inlet to damage the inner bag. When only the inner bag separation is performed without performing the preliminary delamination, the insertion tool sometimes damages the inner bag in the inner bag separation. From the above reasons, it is found that both the preliminary delamination and the inner bag separation have to be performed prior to the valve member mounting.

Various embodiments in the second aspect of the present invention are described below as examples. The embodiments below may be combined with each other.

Preferably, in the preliminary delamination, the air is blown from the fresh air inlet.

Preferably, the insertion tool has a shape with a round end and capable of inserting into the fresh air inlet without expanding the fresh air inlet.

Preferably, the valve member includes: an axis portion disposed in the fresh air inlet; a lid having a shape capable of closing the fresh air inlet and disposed in an intermediate space between the outer shell and the inner bag; and a locking portion disposed outside the outer shell and preventing entrance of the valve member inside the outer shell, and in the valve member mounting, the valve member is mounted to the outer shell by pressing the lid into the fresh air inlet from outside the outer shell for insertion.

Third Aspect

According to the third aspect of the present invention, an air leakage inspection method for a delaminatable container is provided, the container including a storage portion to store contents, a mouth to deliver the contents from the storage portion, and a container body having an outer shell and an inner bag, the outer shell including a fresh air inlet communicating with an intermediate space between the outer shell and the inner bag and an external space of the container body, the method includes air leakage inspection, measuring, when air is injected from one of the mouth and the fresh air inlet, a flow rate of air leaked from another of the mouth and the fresh air inlet.

In the method of the third aspect of the present invention, when air is injected from one of the mouth and the fresh air inlet, a flow rate of air leaked from the other of the mouth and the fresh air inlet is measured. It is thus possible to sense slight leakage of air due to an extremely small pinhole and to highly accurately detect whether there is a pinhole in the inner bag.

Various embodiments in the third aspect of the present invention are described below as examples. The embodiments below may be combined with each other.

Preferably, the air is injected from the mouth and a flow rate of air leaked from the fresh air inlet is measured.

Preferably, the air is injected at a pressure of 0.12 MPa or more.

Preferably, the air leakage inspection is performed after a valve member is inserted into the fresh air inlet.

Preferably, the air leakage inspection is performed while a force in a direction of separating the lid away from the outer shell is applied to the valve member.

Preferably, the valve member includes: an axis portion disposed in the fresh air inlet; a lid having a shape capable of closing the fresh air inlet and disposed in the intermediate space; and a locking portion provided on the external space side of the axis portion and preventing entrance of the valve member inside the outer shell, and is mounted to the outer shell to continuously apply a biasing force, to the lid, in a direction of pressing the lid against the outer shell.

BRIEF DESCRIPTION OF DRAWINGS

FIG. 1A illustrates an overall view, FIG. 1B illustrates the bottom, and FIG. 1C illustrates an enlarged view of and around a valve member mounting recess 7a. FIG. 1C illustrates a state of removing a valve member 5.

FIG. 2A is a front view, FIG. 2B is a rear view, FIG. 2C is a plan view, and FIG. 2D is a bottom view.

FIG. 3 is an A-A cross-sectional view in FIG. 2D. Note that FIGS. 1A through 2D illustrate states before bending a bottom seal protrusion 27 and FIG. 3 illustrates a state after bending the bottom seal protrusion 27.

FIG. 4 is an enlarged view of a region including a mouth 9 in FIG. 3.

FIG. 5 illustrates a state where delamination of an inner bag 14 proceeds from the state in FIG. 4.

FIG. 6A illustrates a state before bending the bottom seal protrusion 27 and FIG. 6B illustrates.

FIGS. 8A-8B are perspective views of the valve member 5, FIG. 8C is a front view of the valve member 5, and FIGS.

8D-8E are front views (cross-sectional views for an outer shell 12) illustrating a state of the valve member 5 mounted to a fresh air inlet 15.

Figure 1A:
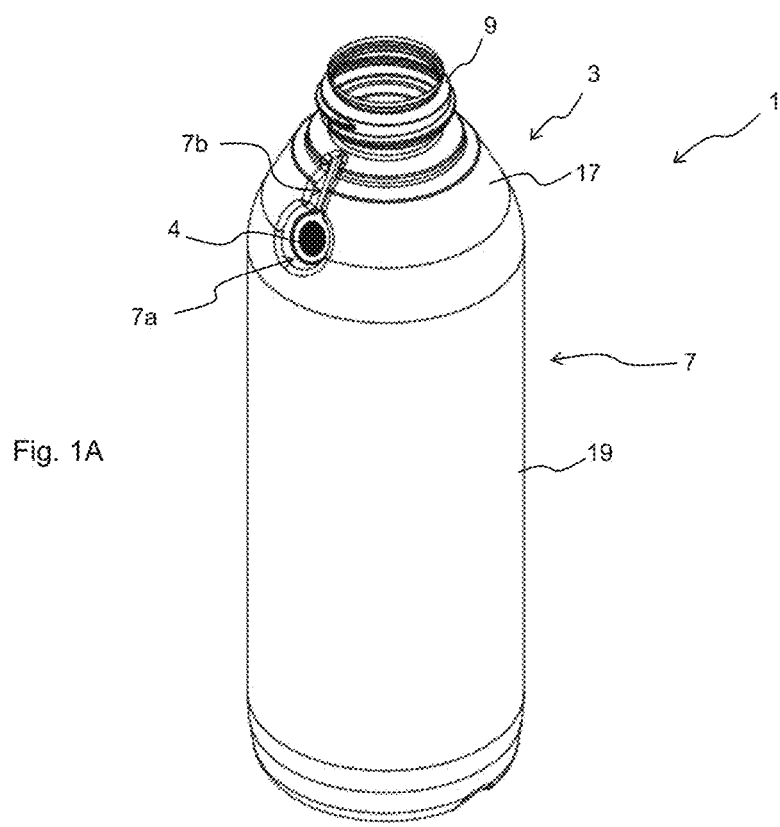
FIGS. 1A-1C are perspective views illustrating a structure of a delaminatable container 1 in first to third aspects of a first embodiment of the present invention, where
Figure 1B:
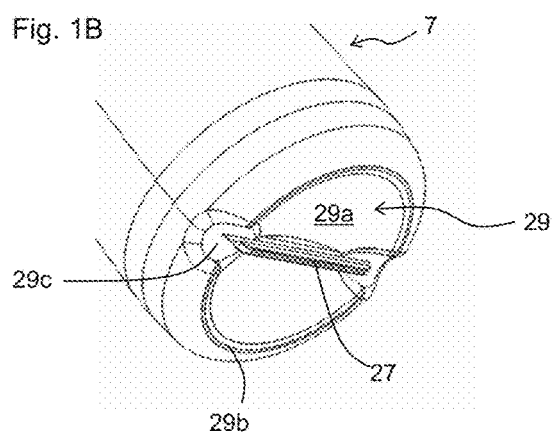
Figure 1C:
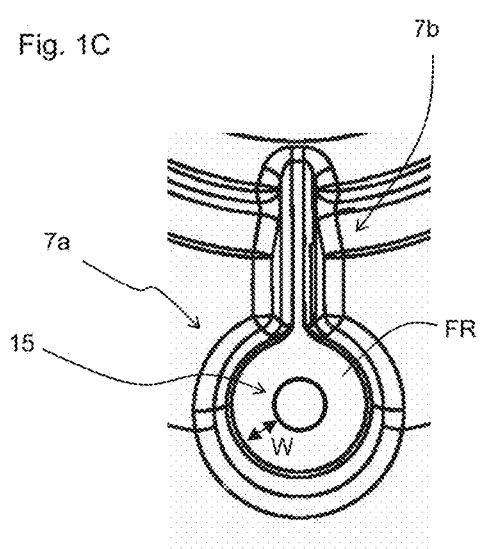
Figure 2C:
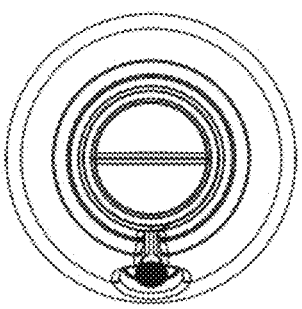
FIGS. 2A-2D illustrate the delaminatable container 1 in FIGS. 1A-1C, where
Figure 2A:
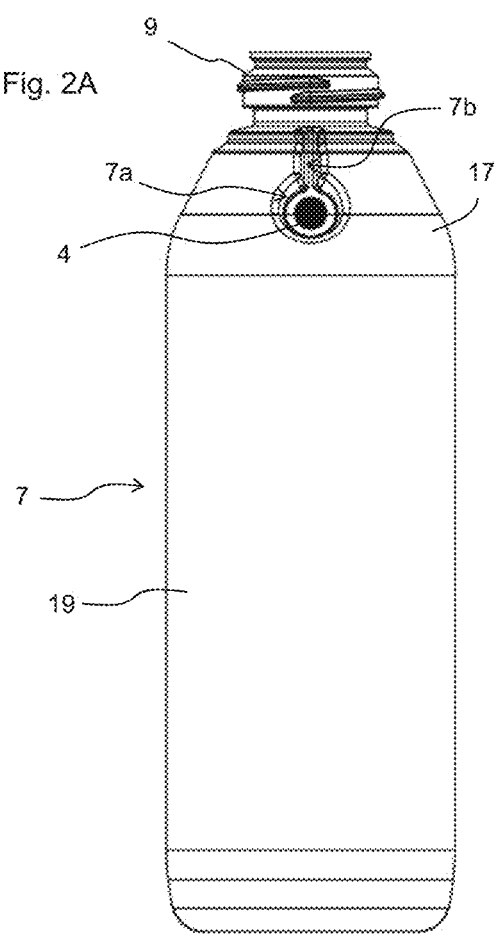
Figure 2B:
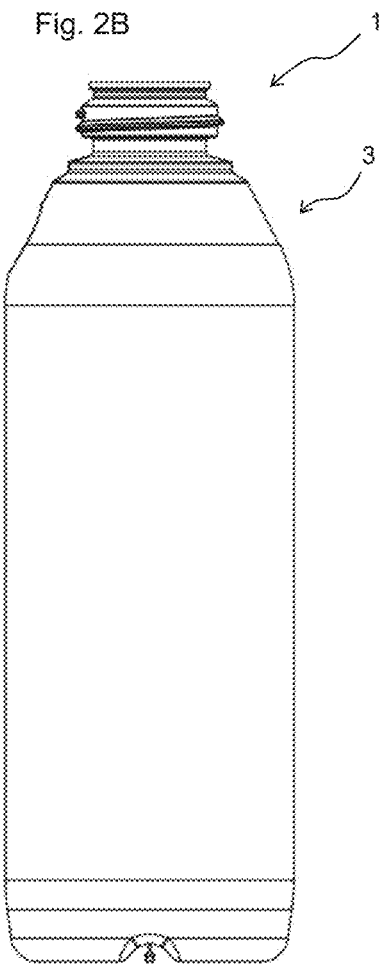
Figure 2D:
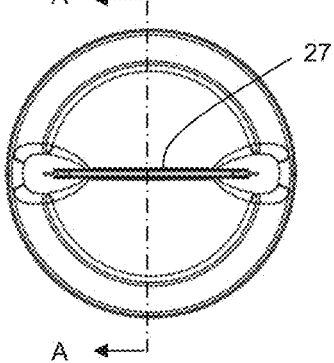

FIGS. 9A-9D illustrate a procedure of manufacturing the delaminatable container 1 in FIGS. 1A-1C.

FIGS. 10A-10D illustrate the procedure of manufacturing the delaminatable container 1 in FIGS. 1A-1C following FIG. 9D, and particularly illustrate steps of fresh air inlet formation and air blowing preliminary delamination.

FIGS. 11A-11E illustrate configuration of a boring drill 30 used for formation of a fresh air inlet 15 in FIGS. 10A-10D, where FIG. 11A is a front view, FIG. 11B is a left side view, FIG. 11C is an A-A cross-sectional view, FIG. 11D is an enlarged view of a region B, and FIG. 11E is an enlarged view of a region C.

Figure 12B:
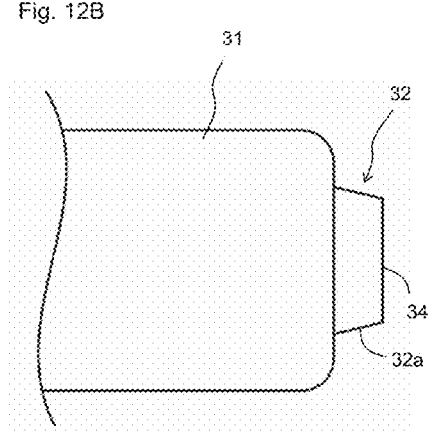
Figure 12A:
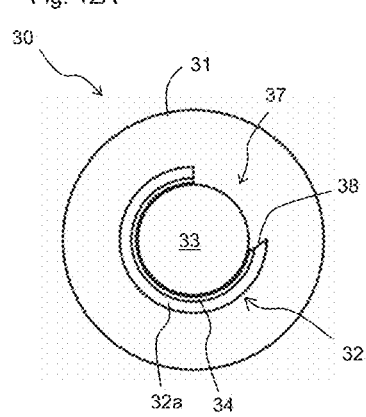

FIGS. 12A, 12B illustrate another configuration of the drill 30 used for formation of the fresh air inlet 15 in FIGS. 10A-10D, where FIG. 12A is a front view and FIG. 12B is a left side view.

Figure 10A:
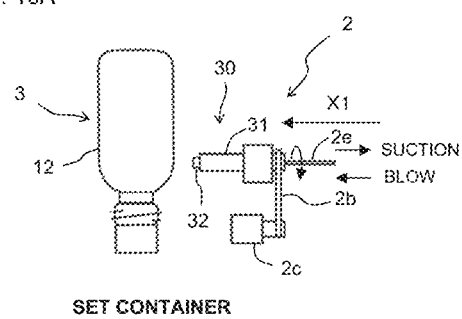
Figure 10B:
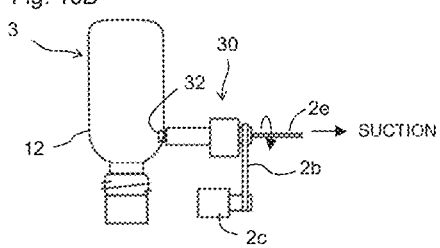
Figure 10C:
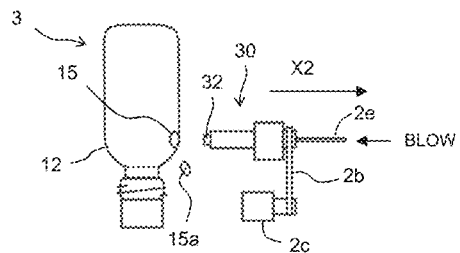
Figure 10D:
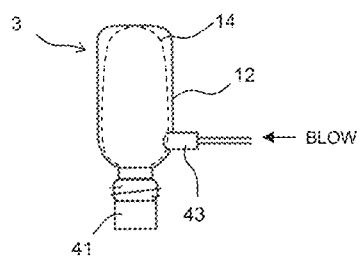

FIGS. 13A-13G illustrate the procedure of manufacturing the delaminatable container 1 in FIGS. 1A-1C following FIG. 10D.

Figure 13A:
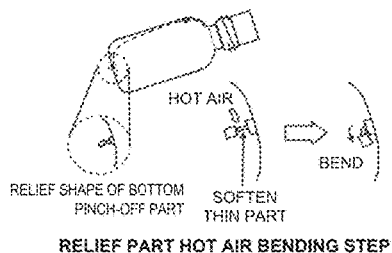
Figure 13B:
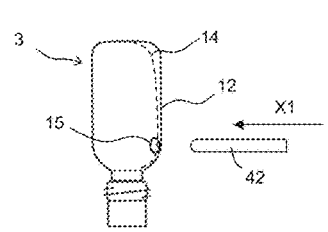
Figure 13C:
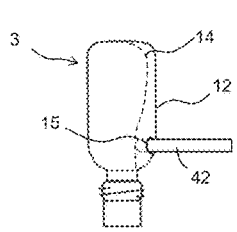

FIGS. 14A-14D are cross-sectional views illustrating details of the inner bag separation in FIGS. 13B-13C, where FIGS. 14A-14B illustrate a case of performing the air blowing preliminary delamination and FIGS. 14C-14D illustrate a case of not performing the air blowing preliminary delamination.

Figure 13D:
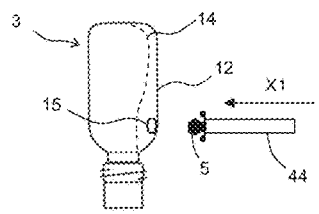
Figure 13E:
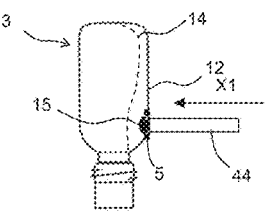

FIGS. 15A-15D are cross-sectional views (front views for the valve member 5) illustrating details of the valve member mounting in FIGS. 13D-13E, where FIGS. 15A-15B illustrate a case of performing the inner bag separation and FIGS. 15C-15D illustrate a case of not performing the inner bag separation.

Figure 13F:
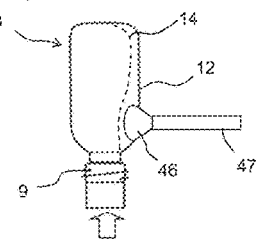
Figure 16:
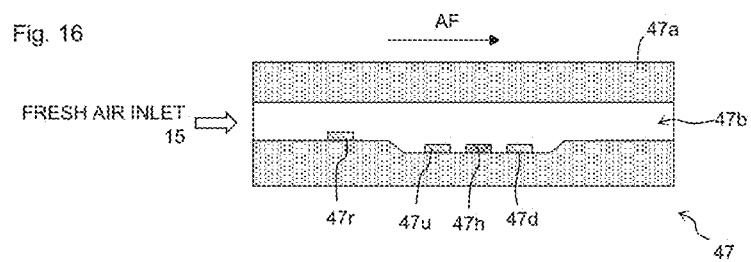

FIG. 16 is a cross-sectional view to describe the principle of a flowmeter 47 in FIG. 13F.

FIG. 17A is a perspective view illustrating positional relationship between the valve member 5 and the flowmeter 47 during the air leakage inspection, FIG. 17B is a cross-sectional view corresponding to an A-A cross section in FIG. 17A in a state of the valve member 5 mounted to the outer shell 12, and FIG. 17C is a cross-sectional view corresponding to a B-B cross section in FIG. 17A in the state of the valve member 5 mounted to the outer shell 12.

Figure 13G:
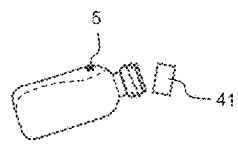

FIGS. 18A-18E illustrate the procedure of manufacturing the delaminatable container 1 in FIGS. 1A-1C following FIG. 13G, where FIGS. 18A-18B illustrate the entire circumference preliminary delamination and FIGS. 18C-18E illustrate post processing thereof.

FIG. 19 illustrates another configuration example of the pressing mechanism in the entire circumference preliminary delamination.

FIG. 20 illustrates still another configuration example of the pressing mechanism in the entire circumference preliminary delamination.

FIGS. 21A-21F illustrate a method of using the delaminatable container 1 in FIGS. 1A-1C.

DESCRIPTION OF EMBODIMENTS

First to third aspects of embodiments of the present invention are described below. Various characteristics in the embodiments described below may be combined with each other. Each characteristic is independently inventive.

As illustrated in FIGS. 1A through 2D, a delaminatable container 1 in first to third aspects of the first embodiment of the present invention is provided with a container body 3 and a valve member 5. The container body 3 is provided with a storage portion 7 to store contents and a mouth 9 to deliver the contents from the storage portion 7.

As illustrated in FIG. 3, the container body 3 is provided with an outer layer 11 and an inner layer 13 in the storage portion 7 and the mouth 9. An outer shell 12 is composed of the outer layer 11 and an inner bag 14 is composed of the inner layer 13. Due to delamination of the inner layer 13 from the outer layer 11 with a decrease in the contents, the inner bag 14 delaminates from the outer shell 12 to be shrunk.

As illustrated in FIG. 4, the mouth 9 is equipped with external threads 9d. To the external threads 9d, a cap, a pump, or the like having internal threads is mounted. FIG. 4 partially illustrates a cap 23 having an inner ring 25. The inner ring 25 has an outer diameter approximately same as an inner diameter of the mouth 9. An outer surface of the inner ring 25 abuts on an abutment surface 9a of the mouth 9, thereby preventing leakage of the contents. In the present embodiment, the mouth 9 is equipped with an enlarged diameter portion 9b at the end. The enlarged diameter portion 9b has an inner diameter greater than the inner diameter in an abutment portion 9e, and thus the outer surface of the inner ring 25 does not make contact with the enlarged diameter portion 9b. When the mouth 9 does not have the enlarged diameter portion 9b, a defect sometimes occurs in which the inner ring 25 enters between the outer layer 11 and the inner layer 13 in the case where the mouth 9 has an even slightly smaller inner diameter due to variations in manufacturing. In contrast, when the mouth 9 has the enlarged diameter portion 9b, such defect does not occur even in the case where the mouth 9 has a slightly varied inner diameter.

The mouth 9 is also provided with an inner layer support portion 9c to inhibit slip down of the inner layer 13 in a position closer to the storage portion 7 than the abutment portion 9e. The inner layer support portion 9c is formed by providing a narrow part in the mouth 9. Even when the mouth 9 is equipped with the enlarged diameter portion 9b, the inner layer 13 sometimes delaminates from the outer layer 11 due to friction between the inner ring 25 and the inner layer 13. In the present embodiment, even in such case, the inner layer support portion 9c inhibits slip down of the inner layer 13, and thus it is possible to inhibit falling out of the inner bag 14 in the outer shell 12.

As illustrated in FIGS. 3 through 5, the storage portion 7 is provided with a main portion 19 having an approximately constant cross-sectional shape in longitudinal directions of the storage portion and a shoulder portion 17 linking the main portion 19 to the mouth 9. The shoulder portion 17 is equipped with a bent portion 22. The bent portion 22 is an area with a bending angle α illustrated in FIG. 3 of 140 degrees or less and having a radius of curvature on a container inner surface side of 4 mm or less. Without the bent portion 22, the delamination between the inner layer 13 and the outer layer 11 sometimes extends from the main portion 19 to the mouth 9 to delaminate the inner layer 13 from the outer layer 11 even in the mouth 9. The delamination of the inner layer 13 from the outer layer 11 in the mouth 9 is, however, undesirable because the delamination of the inner layer 13 from the outer layer 11 in the mouth 9 causes falling out of the inner bag 14 in the outer shell 12. Since the bent portion 22 is provided in the present embodiment, even when delamination between the inner layer 13 and the outer layer 11 extends from the main portion 19 to the bent portion 22, the inner layer 13 is bent at the bent portion 22 as illustrated in FIG. 5 and the force to delaminate the inner layer 13 from the outer layer 11 is not transmitted to the area above the bent portion 22. As a result, the delamination between the inner layer 13 and the outer layer 11 in the area above the bent portion 22 is inhibited. Although, in FIGS. 3 through 5, the bent portion 22 is provided in the shoulder portion 17, the bent portion 22 may be provided at the boundary between the shoulder portion 17 and the main portion 19.

Although the lower limit of bending angle α is not particularly defined, it is preferably 90 degrees or more for ease of manufacture. Although the lower limit of the radius of curvature is not particularly defined, it is preferably 0.2 mm or more for ease of manufacture. In order to prevent delamination of the inner layer 13 from the outer layer 11 in the mouth 9 more securely, the bending angle α is preferably 120 degrees or less and the radius of curvature is preferably 2 mm or less. Specifically, the bending angle α is, for example, 90, 95, 100, 105, 110, 115, 120, 125, 130, 135, and 140 degrees or it may be in a range between any two values exemplified here. Specifically, the radius of curvature is, for example, 0.2, 0.4, 0.6, 0.8, 1, 1.2, 1.4, 1.6, 1.8, and 2 mm or it may be in a range between any two values exemplified here.

As illustrated in FIG. 4, the bent portion 22 is provided in a position where a distance L2 from a container center axis C to the container inner surface in the bent portion 22 is 1.3 times or more of a distance L1 from the container center axis C to the container inner surface in the mouth 9. The delaminatable container 1 in the present embodiment is formed by blow molding. The larger L2/L1 causes a larger blow ratio in the bent portion 22, which results in a thinner thickness. When L2/L1 1.3, the thickness of the inner layer 13 in the bent portion 22 thus becomes sufficiently thin and the inner layer 13 is easily bent at the bent portion 22 to more securely inhibit delamination of the inner layer 13 from the outer layer 11 in the mouth 9. L2/L1 is, for example, from 1.3 to 3 and preferably from 1.4 to 2. Specifically, L2/L1 is, for example, 1.3, 1.4, 1.5, 1.6, 1.7, 1.8, 1.9, 2, 2.5, and 3 or it may be in a range between any two values exemplified here.

To give an example, the thickness in the mouth 9 is from 0.45 to 0.50 mm, the thickness in the bent portion 22 is from 0.25 to 0.30 mm, and the thickness of the main portion 19 is from 0.15 to 0.20 mm. The thickness in the bent portion 22 is thus sufficiently less than the thickness in the mouth 9, thereby effectively exhibiting functions of the bent portion 22.

As illustrated in FIG. 4, the storage portion 7 is equipped with the valve member 5 to regulate entrance and exit of air between an external space S of the container body 3 and an intermediate space 21 between the outer shell 12 and the inner bag 14. The outer shell 12 is equipped with a fresh air inlet 15 communicating with the intermediate space 21 and the external space S in the storage portion 7. The fresh air inlet 15 is a through hole provided only in the outer shell 12 and does not reach the inner bag 14. As illustrated in FIGS. 4 and 8A-8E, the valve member 5 is provided with an axis portion 5a disposed in the fresh air inlet 15, a lid 5c having a shape capable of closing the fresh air inlet 15 and disposed in the intermediate space 21, and a locking portion 5b provided on the external space S side of the axis portion 5a and preventing entrance of the valve member 5 inside the outer shell 12. The axis portion 5a has a diameter smaller than the diameter of the fresh air inlet 15 and the lid 5c has a diameter larger than the diameter of the fresh air inlet 15. The locking portion 5b is provided with a pair of foundation portions 5b1 and a bridge portion 5b2 disposed between the foundation portions 5b1. The axis portion 5a is provided on the bridge portion 5b2.

The lid 5c is configured to close the fresh air inlet 15 when the outer shell 12 is compressed and is provided with a tapered surface 5d to have a smaller cross-sectional area as coming closer to the axis portion 5a. An inclination angle β of the tapered surface 5d illustrated in FIG. 8C is preferably from 15 to 45 degrees to a direction D in which the axis portion 5a extends and even more preferably from 20 to 35 degrees. This is because air leakage is prone to occur when the inclination angle β is too large and the valve member 5 becomes long when too small.

As illustrated in FIG. 8D, the locking portion 5b is configured, in a state of mounted to the fresh air inlet 15, in such a manner that the foundation portions 5b1 has abutment surfaces 5e to abut on the outer shell 12 and the bridge portion 5b2 deflects. According to such configuration, a restoring force is generated in the bridge portion 5b2 in a direction separating from the container as illustrated by an arrow FO, thereby exerting a biasing force in the same direction on the lid 5c to press the lid 5c against the outer shell 12.

In this state, the lid 5c is only lightly pressed against the outer shell 12. However, when the outer shell 12 is compressed, the pressure in the intermediate space 21 becomes higher than external pressure and the pressure difference causes the lid 5c to be even more strongly pressed against the fresh air inlet 15 to close the fresh air inlet 15 by the lid 5c. Since the lid 5c is equipped with the tapered surface 5d, the lid 5c readily fits into the fresh air inlet 15 to close the fresh air inlet 15.

When the outer shell 12 is further compressed in this state, the pressure in the intermediate space 21 is increased, and as a result, the inner bag 14 is compressed to deliver the contents in the inner bag 14. When the compressive force to the outer shell 12 is released, the outer shell 12 attempts to restore its shape by the elasticity of its own. The pressure in the intermediate space 21 is reduced with the restoration of the outer shell 12, thereby applying a force FI, as illustrated in FIG. 8E, in a direction inside the container to the lid 5c. This increases the deflection of the bridge portion 5b2 and forms a gap Z between the lid 5c and the outer shell 12 to introduce fresh air in the intermediate space 21 through a path 5f between the bridge portion 5b2 and the outer shell 12, the fresh air inlet 15, and the gap Z.

The valve member 5 is mounted to the container body 3 by inserting the lid 5c into the intermediate space 21 while the lid 5c presses and expands the fresh air inlet 15. The lid 5c, therefore, preferably has an end in a tapered shape. Since such valve member 5 can be mounted only by pressing the lid 5c from outside the container body 3 into the intermediate space 21, it is excellent in productivity. The valve member 5 can be molded by injection molding or the like using a split die of a simple configuration that splits in arrow X directions along a parting line L illustrated in FIG. 8A and thus is excellent in productivity.

After the valve member 5 is mounted, the storage portion 7 is covered with a shrink film. At this point, not to allow the valve member 5 to interfere with the shrink film, the valve member 5 is mounted to a valve member mounting recess 7a provided in the storage portion 7. Not to seal the valve member mounting recess 7a with the shrink film, an air circulation groove 7b extending from the valve member mounting recess 7a in the direction of the mouth 9 is provided.

The valve member mounting recess 7a is provided in the shoulder portion 17 of the outer shell 12. The shoulder portion 17 is an inclined surface, and a flat region FR is provided in the valve member mounting recess 7a. Since the flat region FR is provided approximately in parallel with the inclined surface of the shoulder portion 17, the flat region FR is also an inclined surface. Since the fresh air inlet 15 is provided in the flat region FR in the valve member mounting recess 7a, the fresh air inlet 15 is provided in the inclined surface. When the fresh air inlet 15 is provided in, for example, a vertical surface of the main portion 19, there is a risk that the once delaminated inner bag 14 makes contact with the valve member 5 to interfere with movement of the valve member 5. In the present embodiment, since the fresh air inlet 15 is provided in the inclined surface, there is no such risk and smooth movement of the valve member 5 is secured. Although not particularly limited, an inclination angle of the inclined surface is preferably from 45 to 89 degrees, more preferably from 55 to 85 degrees, and even more preferably from 60 to 80 degrees.

As illustrated in FIG. 1C, the flat region FR in the valve member mounting recess 7a is provided across a width W of 3 mm or more (preferably 3.5 mm, 4 mm, or more) surrounding the fresh air inlet 15. For example, when the fresh air inlet 15 is φ4 mm and the fresh air inlet 15 is formed at the center of the flat region FR, the valve member mounting recess 7a is designed to be φ10 mm or more. Although the upper limit of the width W of the flat region FR is not particularly defined, the width W is preferably not too large because a larger width W of the flat region FR causes the valve member mounting recess 7a to have a greater area, and as a result, the area of the gap between the outer shell 12 and the shrink film. The upper limit is, for example, 10 mm. Accordingly, the width W is, for example, from 3 to 10 mm. Specifically, it is, for example, 3, 3.5, 4, 4.5, 5, 6, 7, 8, 9, and 10 mm or it may be in a range between any two values exemplified here.

According to an experiment by the present inventors, it is found that a wider flat region FR on an outer surface side of the outer shell 12 causes a larger radius of curvature on an inner surface of the outer shell 12, and when the flat region FR is provided across the range of 3 mm or more surrounding the fresh air inlet 15 on the outer surface side of the outer shell, the radius of curvature on the inner surface of the outer shell 12 is sufficiently large, and as a result, the close adherence between the outer shell 12 and the valve member 5 is improved. The radius of curvature on the inner surface of the outer shell 12 is preferably 200 mm or more in a range of 2 mm surrounding the fresh air inlet 15 and even more preferably 250 mm or more or 300 mm or more. This is because, when the radius of curvature has such value, the inner surface of the outer shell 12 substantially becomes flat and the close adherence between the outer shell 12 and the valve member 5 is good.

Figure 6A:
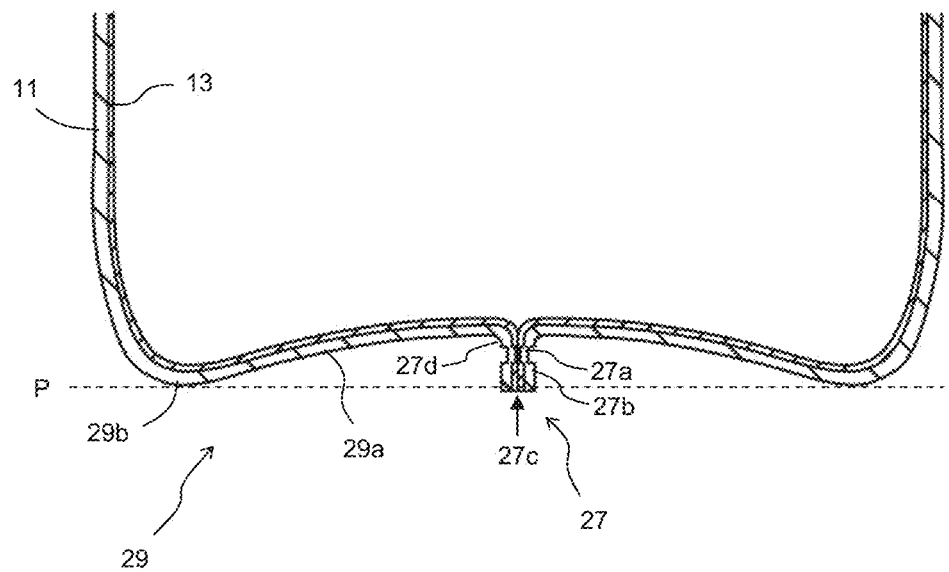
FIGS. 6A, 6B are enlarged views of a region including a bottom surface 29 in FIG. 3, where
Figure 6B:
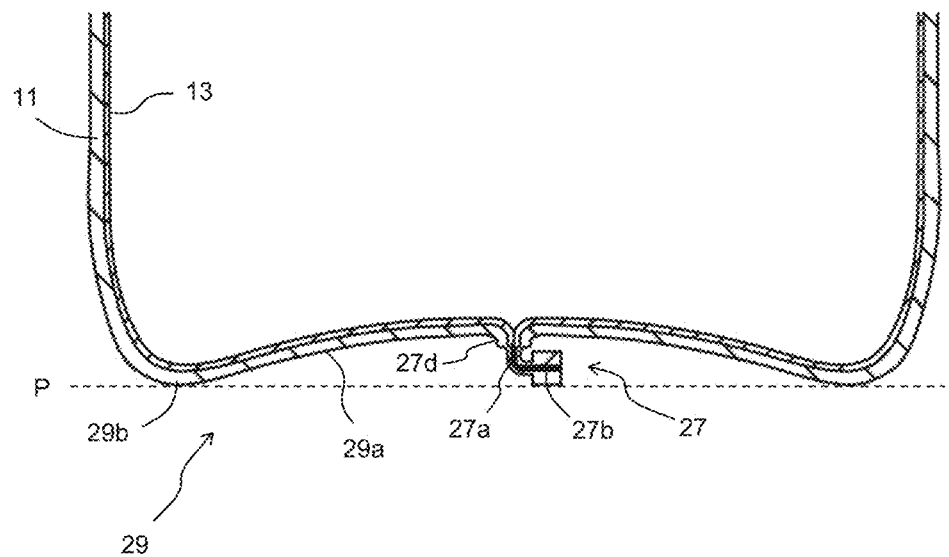

As illustrated in FIG. 1B, the storage portion 7 has a bottom surface 29 equipped with a central concave region 29a and a peripheral region 29b surrounding the former region, and the central concave region 29a is provided with a bottom seal protrusion 27 protruding from the bottom surface 29. As illustrated in FIGS. 6A and 6B, the bottom seal protrusion 27 is a sealing portion of a laminated parison in blow molding using a tubular laminated parison provided with the outer layer 11 and the inner layer 13. The bottom seal protrusion 27 is provided with, in order from the bottom surface 29 side, a base portion 27d, a thinner portion 27a, and a thicker portion 27b having a thickness greater than that of the thinner portion 27a.

Immediately after blow molding, as illustrated in FIG. 6A, the bottom seal protrusion 27 is in a state of standing approximately vertically to a plane P defined by the peripheral region 29b. In this state, however, when impact is applied to the container, the inner layers 13 in a welded portion 27c are prone to be separated from each other and the impact resistance is insufficient. In the present embodiment, the thinner portion 27a is softened by blowing hot air on the bottom seal protrusion 27 after blow molding to bend the bottom seal protrusion 27, as illustrated in FIG. 6B, in the thinner portion 27a. The impact resistance of the bottom seal protrusion 27 is thus improved simply by a simple procedure of bending the bottom seal protrusion 27. In addition, as illustrated in FIG. 6B, the bottom seal protrusion 27 does not protrude from the plane P defined by the peripheral region 29b in a state of being bent. This prevents, when the delaminatable container 1 is stood, instability of the delaminatable container 1 due to the bottom seal protrusion 27 sticking out of the plane P.

The base portion 27d is provided on the bottom surface 29 side closer than the thinner portion 27a and is an area thicker than the thinner portion 27a. Although the base portion 27d does not have to be provided, the impact resistance of the bottom seal protrusion 27 is further improved by providing the thinner portion 27a on the base portion 27d.

As illustrated in FIG. 1B, the concave region in the bottom surface 29 is provided across the entire bottom surface 29 in longitudinal directions of the bottom seal protrusion 27. That is, the central concave region 29a and the peripheral concave region 29c are connected. Such structure facilitates bending of the bottom seal protrusion 27.

The layer structure of the container body 3 is described below in further detail. The container body 3 is provided with the outer layer 11 and the inner layer 13. The outer layer 11 is formed with a larger thickness than the inner layer 13 so as to increase the restorability thereof.

Figure 7:
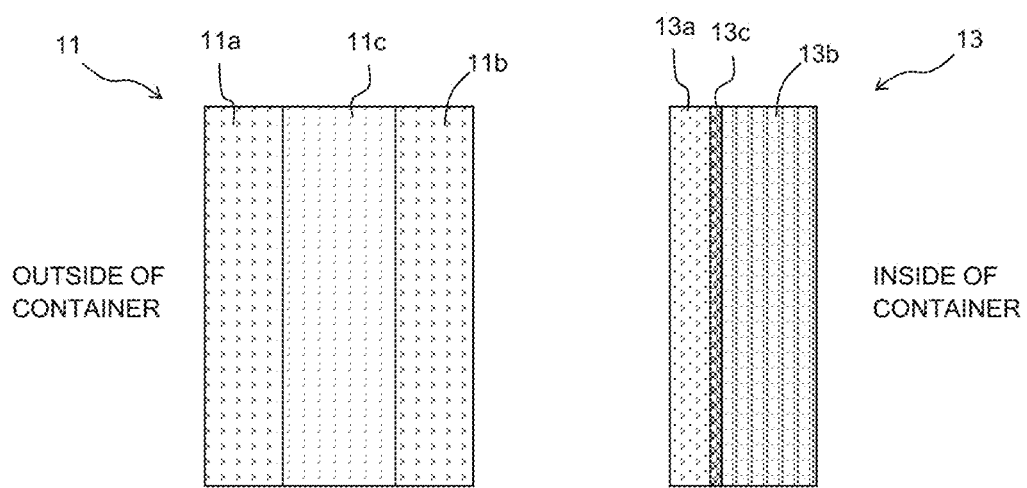
FIG. 7 is cross-sectional views illustrating layer structures of the outer layer 11 and the inner layer 13.

The outer layer 11 is formed of, for example, low-density polyethylene, linear low-density polyethylene, high-density polyethylene, polypropylene, ethylene-propylene copolymer, or a mixture thereof, or the like. The outer layer 11 consists of a single layer or multiple layers, and at least one of the innermost and outermost layers thereof contains a lubricant. If the outer layer 11 consists of a single layer, that single layer serves as both innermost and outermost layers. Accordingly, that layer only has to contain a lubricant. If the outer layer 11 consists of two layers, the layer closer to the inside of the container serves as the innermost layer, and the layer closer to the outside of the container serves as the outermost layer. Accordingly, at least one of these layers only has to contain a lubricant. If the outer layer 11 consists of three or more layers, the layer closest to the inside of the container serves as the innermost layer, and the layer closest to the outside of the container serves as the outermost layer. As shown in FIG. 7, the outer layer 11 preferably includes a repro layer 11c between an innermost layer 11b and an outermost layer 11a. As used herein, the term "repro layer" refers to a layer formed by recycling burrs generated when a container is molded. Further, if the outer layer 11 consists of multiple layers, both the innermost and outermost layers preferably contain a lubricant.

The lubricant may be any type of commercially available common lubricant. The lubricant may be one of a hydrocarbon-based lubricant, a fatty acid-based lubricant, an aliphatic amide-based lubricant, a metal soap-based lubricant, and a combination of two or more thereof. Examples of the hydrocarbon-based lubricant include liquid paraffin, paraffin wax, and synthesized polyethylene wax. Examples of the fatty acid-based lubricant include stearic acid and stearyl alcohol. Examples of the aliphatic amide-based lubricant include fatty amides, such as stearamide, oleic amide, and erucic acid amide, and alkylene fatty amides, such as methylene bis(stearamide) and ethylene bis(stearamide).

The innermost layer of the outer layer 11 is a layer that makes contact with the inner layer 13. By containing the lubricant in the innermost layer of the outer layer 11, it is possible to improve delamination properties between the outer layer 11 and the inner layer 13 and to improve deliverability of the contents of the delaminatable container. Meanwhile, the outermost layer of the outer layer 11 is a layer that makes contact with a die during blow molding. By containing the lubricant in the outermost layer of the outer layer 11, it is possible to improve releasability.

One or both of the innermost layer and the outermost layer of the outer layer 11 may be formed with a random copolymer of propylene and another monomer. This enables improvement in shape restorability, transparency, and heat resistance of the outer shell 12.

The random copolymer has a content of a monomer other than propylene of less than 50 mol % and preferably from 5 to 35 mol %. Specifically, this content is, for example, 5, 10, 15, 20, 25, and 30 mol % or it may be in a range between any two values exemplified here. The monomer to be copolymerized with propylene may be one that improves impact resistance of the random copolymer compared with a homopolymer of polypropylene, and ethylene is particularly preferred. In the case of a random copolymer of propylene and ethylene, the ethylene content is preferably from 5 to 30 mol %. Specifically, it is, for example, 5, 10, 15, 20, 25, and 30 mol % or it may be in a range between any two values exemplified here. The random copolymer preferably has a weight average molecular weight from 100 thousands to 500 thousands, and even more preferably from 100 thousands to 300 thousands. Specifically, the weight average molecular weight is, for example, 100 thousands, 150 thousands, 200 thousands, 250 thousands, 300 thousands, 350 thousands, 400 thousands, 450 thousands, and 500 thousands or it may be in a range between any two values exemplified here.

The random copolymer has a tensile modulus of elasticity preferably from 400 to 1600 MPa and more preferably from 1000 to 1600 MPa. This is because the shape restorability is particularly good with a tensile modulus of elasticity in such range. Specifically, the tensile modulus of elasticity is, for example, 400, 500, 600, 700, 800, 900, 1000, 1100, 1200, 1300, 1400, 1500, and 1600 Mpa or it may be in a range between any two values exemplified here.

Since an excessively hard container impairs feeling of using the container, a mixture obtained by mixing a flexible material, such as linear low density polyethylene, with the random copolymer may be used. Note that, in order not to severely interfere with effective properties of the random copolymer, the material to be mixed with the random copolymer is preferably mixed to be less than 50 weight % based on the entire mixture. For example, a mixture obtained by mixing the random copolymer and linear low-density polyethylene at a weight ratio of 85:15 may be used.

As illustrated in FIG. 7, the inner layer 13 includes an EVOH layer 13a provided on a container outer surface side, an inner surface layer 13b provided on a container inner surface side of the EVOH layer 13a, and an adhesion layer 13c provided between the EVOH layer 13a and the inner surface layer 13b. By providing the EVOH layer 13a, it is possible to improve gas barrier properties and delamination properties from the outer layer 11.

The EVOH layer 13a is a layer containing an ethylene-vinyl alcohol copolymer (EVOH) resin and is obtained by hydrolysis of a copolymer of ethylene and vinyl acetate. The EVOH resin has an ethylene content, for example, from 25 to 50 mol %, and from the perspective of oxygen barrier properties, it is preferably 32 mol % or less. Although not particularly defined, the lower limit of the ethylene content is preferably 25 mol % or more because the flexibility of the EVOH layer 13a is prone to decrease when the ethylene content is less. The EVOH layer 13a preferably contains an oxygen absorbent. The content of an oxygen absorbent in the EVOH layer 13a further improves the oxygen barrier properties of the EVOH layer 13a.

The EVOH resin preferably has a melting point higher than the melting point of the resin contained in the outer layer 11. When the fresh air inlet 15 is formed in the outer layer 11 using a thermal perforator, the inlet can be prevented from reaching the inner layer 13 by the EVOH resin having a melting point higher than the melting point of the resin contained in the outer layer 11. From this perspective, a greater difference of (Melting Point of EVOH)−(Melting Point of the Resin from which the outer layer 11 is formed) is desired, and it is preferably 15° C. or more and particularly preferably 30° C. or more. The difference in melting points is, for example, from 5 to 50° C. Specifically, it is, for example, 5, 10, 15, 20, 25, 30, 35, 40, 45, and 50° C. or it may be in a range between any two values exemplified here.

The inner surface layer 13b is a layer to make contact with the contents of the delaminatable container 1. It contains, for example, polyolefin, such as low density polyethylene, linear low density polyethylene, high density polyethylene, polypropylene, an ethylene-propylene copolymer, and a mixture thereof, and preferably low density polyethylene or linear low density polyethylene. The resin contained in the inner surface layer 13b preferably has a tensile modulus of elasticity from 50 to 300 MPa and more preferably from 70 to 200 MPa. This is because the inner surface layer 13b is particularly flexible when the tensile modulus of elasticity is in such range. Specifically, the tensile modulus of elasticity is, for example, specifically for example, 50, 100, 150, 200, 250, and 300 Mpa or it may be in a range between any two values exemplified here.

The adhesion layer 13c is a layer having a function of adhering the EVOH layer 13a to the inner surface layer 13b, and it is, for example, a product of adding acid modified polyolefin (e.g., maleic anhydride modified polyethylene) with carboxyl groups introduced therein to polyolefin described above or an ethylene-vinyl acetate copolymer (EVA). An example of the adhesion layer 13c is a mixture of acid modified polyethylene with low density polyethylene or linear low density polyethylene.

A description is then given to an example of a method of manufacturing the delaminatable container 1 in the present embodiment.

First, as illustrated in FIG. 9A, a laminated parison in a melted state with a laminated structure (e.g., a laminated structure of PE layer/adhesion layer/EVOH layer/PP layer/repro layer/PP layer in order from the container inner surface side) corresponding to the container body 3 to be manufactured is extruded. Then, the laminated parison in the melted state is set in a blow molding split die and the split die is closed.

Next, as illustrated in FIG. 9B, a blowing nozzle is inserted into an opening of the mouth 9 of the container body 3 to blow air into a cavity of the split die in the mold closing state.

Then, as illustrated in FIG. 9C, the split die is opened to take out a blow molded article. The split die has a cavity shape to form various shapes of the container body 3, such as the valve member mounting recess 7a, the air circulation groove 7b, and the bottom seal protrusion 27, in the blow molded article. The split die is provided with a pinch-off below the bottom seal protrusion 27. Lower burrs are thus formed in the area below the bottom seal protrusion 27 and they are removed. In the above procedure, the container body 3 having the outer shell 12 and the inner bag 14 is formed container body formation ( ).

Then, as illustrated in FIG. 9D, the container body 3 thus taken out are aligned.

Then, as illustrated in FIGS. 10A-10C, a perforator 2 is used to form the fresh air inlet 15 in the outer shell 12 of the container body 3 (fresh air inlet formation). This procedure is described in detail below.

First, as illustrated in FIG. 10A, the container body 3 is set in a position close to the perforator 2. The perforator 2 is provided with a boring drill 30, having a body portion 31 and an end portion 32, and a motor 2c to rotationally drive the drill 30 through a transmission belt 2b. The perforator 2 is supported by a servo cylinder (not shown) to single-axis move the perforator 2 by rotation of a servo motor and is configured movably in an arrow X1 direction in FIG. 10A and in an arrow X2 direction in FIG. 10C. Such configuration enables rotation of the drill 30 while pressing the end portion 32 against the outer shell 12 of the container body 3. The control of the position and the moving speed of the perforator 2 by the servo motor enables reduction in tact time.

The drill 30 is provided with a hollow 33 extending from the body portion 31 to the end portion 32 (see, FIGS. 11A to 12B) and is coupled to a ventilation pipe 2e in communication with the hollow 33. The ventilation pipe 2e is coupled to an air intake and exhaust system, not shown. This enables air suction from inside the drill 30 and air blowing inside the drill 30.

As illustrated in FIGS. 11A to 12B, the end portion 32 of the drill 30 is tubular having a C-shaped cross section. The end portion 32 is provided with a flat surface 34 and a notch 37, and the notch 37 has a side of a blade 38. The end portion 32 has a side 32a that may be, as illustrated in FIGS. 11A-11E, vertical to the flat surface 34 or may be, as illustrated in FIGS. 12A, 12B, a tapered surface inclined to the center as coming closer to the flat surface 34. In the latter case, the formed fresh air inlet 15 has an edge of a tapered surface widening towards outside and thus has an advantage of facilitating insertion of the valve member 5.

The flat surface 34 has a radial width W preferably from 0.1 to 0.2 mm and more preferably from 0.12 to 0.18 mm. A too small width W causes easy damage of the inner bag 14 during perforation. A too large width W causes difficulty in contacting the blade 38 with the outer shell 12, making it difficult to perform smooth perforation. The notch 37 is provided in a range preferably from 60 to 120 degrees and more preferably from 75 to 105 degrees. The notch being provided in a too large range causes easy damage of the inner bag 14 during perforation, whereas the notch being provided in a too small range causes difficulty in smooth perforation. The blade 38 has an inclined plane P2 at an angle α to a circumscribed surface P1 preferably from 30 to 65 degrees and more preferably from 40 to 55 degrees. A too small angle α causes easy damage of the inner bag 14 during perforation, whereas a too large angle α causes difficulty in smooth perforation.

The end portion 32 has an inner surface 35 provided with a tapered surface 36 widening towards the end. This facilitates movement of a cut piece 15a (see, FIG. 10C) produced by perforation to the inner surface 35 side, not remaining on the container body 3 side. The tapered surface 36 has an angle to the flat surface 34 preferably from 95 to 110 degrees and more preferably from 95 to 105 degrees. In other words, as illustrated in FIG. 11E, the tapered surface 36 has an angle β in a direction X parallel to the rotation axis of the drill 30 preferably from 5 to 20 degrees and more preferably from 5 to 15 degrees. Further, the inner surface 35 is preferably provided with an approximately annular groove 39 in a concave or V shape with a depth from 0.05 to 0.1 mm and a width from 0.1 to 0.2 mm with a pitch from 0.2 to 1 mm in a direction vertical to the flat surface 34 (direction X parallel to the rotation axis of the drill 30), and in this case, the cut piece 15a more readily moves to the inner surface 35. The pitch of the groove 39 is more preferably from 0.3 to 0.7 mm. The inner surface 35 is preferably subjected to blasting for even easier movement of the cut piece 15a to the inner surface 35.

Then, as illustrated in FIG. 10B, while the drill 30 is rotated, the flat surface 34 is pressed against the outer shell 12. At this point, the flat surface 34 digs a little in the outer shell 12. As a result, the outer shell 12 partially enters the notch 37, and the blade 38 makes contact with the outer shell 12 to cut in the outer shell 12. When the flat surface 34 reaches a boundary between the outer shell 12 and the inner bag 14, the outer shell 12 is circularly hollowed to form the fresh air inlet 15 in a round hole shape. At this point, suction of air inside the drill 30 causes suction of the cut piece 15a, formed by hollowing the outer shell 12, in the hollow 33 of the drill 30.

When the flat surface 34 reaches the boundary between the outer shell 12 and the inner bag 14 and then the flat surface 34 is pressed against the inner bag 14, the inner bag 14 is delaminated from the outer shell 12 to be readily deformed towards inside the container body 3. The flat surface 34 thus does not dig in the inner bag 14 and the inner bag 14 does not make contact with the blade 38 to inhibit damaging of the inner bag 14.

In the present embodiment, the drill 30 is used without heating. This gives an advantage of not melting the edge of the fresh air inlet 15 to form the edge sharply. In order to inhibit influence due to heat generated by the friction between the boring drill 30 and the outer shell 12, the drill 30 is preferably form with a material having a high thermal conductivity (e.g., 35 W/(m·° C.) or higher at 20° C.). To facilitate the perforation more, the drill 30 may be heated. In this case, to keep the inner bag 14 from being melted by the heat of the drill 30, the resin contained in the outermost layer of the inner bag 14 preferably has a melting point higher than the melting point of the resin contained in the innermost layer of the outer shell 12.

Then, as illustrated in FIG. 10C, the perforator 2 is set back in the arrow X2 direction to blow air into the hollow 33 of the drill 30, thereby emitting the cut piece 15a from the edge of the drill 30.

In the above procedures, formation of the fresh air inlet 15 in the outer shell 12 is completed.

Then, as illustrated in FIG. 10D, a blower 43 is used to blow air between the outer shell 12 and the inner bag 14 through the fresh air inlet 15 for preliminary delamination of the inner bag 14 from the outer shell 12 (air blowing preliminary delamination). By blowing air in a defined amount while avoiding air leakage through the fresh air inlet 15, preliminary delamination of the inner bag 14 is readily controlled. In the preliminary delamination in this step, the inner bag 14 may be preliminarily delaminated from the outer shell 12 in the entire storage portion 7 while the inner bag 14 may be preliminarily delaminated from the outer shell 12 only in a partial region of the inner bag 14. In this case, when the delaminatable container is used to deliver the contents, the inner bag 14 in a partial region is not separated from the outer shell 12 and the inner bag 14 in the remaining region shrinks away from the outer shell 12. As a result, the contents in the inner bag 14 are unevenly positioned on a part of the outer shell 12, causing a problem that the center of gravity of the delaminatable container is off-centered and thus the delaminatable container easily falls down. In the present embodiment, as described later, entire circumference preliminary delamination is performed to preliminarily delaminate the inner bag 14 from the outer shell in the entire circumference of the storage portion 7. The entire circumference preliminary delamination is, however, not essential. In addition, the air blowing preliminary delamination is preferred but not essential for the entire circumference preliminary delamination. Air may be blown between the outer shell 12 and the inner bag 14 in a method different from that in the present embodiment. For example, air may be blown in an upper tubular portion 41 illustrated in FIG. 10D between the outer shell 12 and the inner bag 14 through an opening provided in the outer shell 12.

Then, as illustrated in FIG. 13A, the thinner portion 27a is softened by exposing the bottom seal protrusion 27 to hot air to bend the bottom seal protrusion 27.

Then, as illustrated in FIGS. 13B-13C, an insertion tool 42 is moved as illustrated in an arrow X1 direction to insert the insertion tool 42 from the fresh air inlet 15. The inner bag 14 is then pressed inside the container body 3 by the insertion tool 42 to separate the inner bag 14 from the outer shell 12 (inner bag separation). This method allows large local separation of the inner bag 14 from the outer shell 12.

As illustrated in FIGS. 14A-14D, the insertion tool 4 is a rod shaped member in a shape with a round end and allowing insertion into the fresh air inlet 15 without expanding the fresh air inlet 15. That is, the insertion tool 42 preferably has a diameter approximately identical to the diameter of the fresh air inlet 15 or smaller than the diameter of the fresh air inlet 15. Insertion of the insertion tool 42 into the fresh air inlet 15 while moving the tool in the arrow X1 direction in FIG. 14A enables separation of, as illustrated in FIG. 14B, the inner bag 14 from the outer shell 12 near the fresh air inlet 15. The inner bag 14 has a small restoring force, and once the bag is in a state as illustrated in FIG. 14B, the bag does not return to the state of FIG. 14A even when the insertion tool 42 is pulled out. As illustrated in FIG. 14A, a gap 45 is formed between the outer shell 12 and the inner bag 14 by the air blowing preliminary delamination. When the insertion tool 42 is pressed on the inner bag 14, a load from the insertion tool 42 is spread over a wide range as illustrated by arrows F in FIG. 14A to be transmitted to the inner bag 14. In addition, the inner bag 14 is readily deformed towards the inside of the container body 3, and the inner bag 14 is thus not damaged. Meanwhile, as illustrated in FIG. 14C, when the insertion tool 42 is pressed on the inner bag 14 while the outer shell 12 and the inner bag 14 are closely adhered without performing the air blowing preliminary delamination, the load F from the insertion tool 42 is applied to the inner bag 14 without being spread as illustrated in FIG. 14C and the inner bag 14 does not easily delaminate from the outer shell 12. As illustrated in FIG. 14D, the insertion tool 42 may thus penetrate or damage the inner bag 14. Accordingly, it is important to perform the air blowing preliminary delamination prior to the inner bag separation.

Then, as illustrated in FIGS. 13D-13E, a robot arm 44 is moved in the arrow X1 direction while adsorbing the valve member 5 and presses the valve member 5 into the fresh air inlet 15 to mount the valve member 5 to the outer shell 12 (valve member mounting). Specifically, as illustrated in FIGS. 15A-15B, the lid 5c of the valve member 5 is pressed into the fresh air inlet 15 from outside the outer shell 12 for insertion to mount the valve member 5 to the outer shell 12. Since the lid 5c has a diameter larger than that of the fresh air inlet 15, the lid 5c passes through the fresh air inlet 15 while pressing and expanding the fresh air inlet 15. Then, immediately after passing through the fresh air inlet 15, the lid 5c forcibly moves towards the inside of the container body 3. At this point, if the lid 5c collides with the inner bag 14, the inner bag 14 has a risk of being damaged. In the present embodiment, the inner bag 14 is separated from the outer shell 12 in advance in the inner bag separation, and the lid 5c scarcely or not at all makes contact with the inner bag 14 and the inner bag 14 is not damaged. Meanwhile, as illustrated in FIGS. 15C-15D, if the inner bag 14 is adjacent to the outer shell 12 without performing the inner bag separation, the lid 5c forcibly moves towards the inside of the container body 3 immediately after passing through the fresh air inlet 15, and collides with the inner bag 14 to damage the inner bag 14. Accordingly, it is important to perform the inner bag separation prior to the valve member mounting. In the present embodiment, the fresh air inlet 15 is configured to be opened and closed by movement of the valve member 5 that opens and closes the gap between the valve member 5 and the edge of the fresh air inlet 15. Alternatively, the fresh air inlet 15 may be configured to be opened and closed by opening and closing a through hole provided with the valve member 5 itself through an action of an open/close valve, which is also provided in the valve member 5. Even the valve member 5 thus configured is used, there is still a problem that the inner bag 14 may be damaged by pressing the valve member 5 into the fresh air inlet 15 from outside the outer shell 12. In this case as well as the present embodiment, damage in the inner bag 14 can be prevented by performing the air blowing preliminary delamination and the inner bag separation prior to the valve member mounting.

Then, as illustrated in FIG. 13F, air is injected from the mouth 9 of the container body 3 while an end portion 46 of a flowmeter 47 is closely contacted with the container body 3 so as to cover the fresh air inlet 15 for measurement of a flow rate of air leaked from the fresh air inlet 15 then (air leakage inspection). If there is a pinhole in the inner bag 14, the air injected from the mouth 9 leaks out of the fresh air inlet 15 through the pinhole, and whether there is a pinhole in the inner bag 14 can be inspected by measuring the air flow rate. Air may be injected at a pressure higher than atmospheric pressure and is, for example, 0.12 MPa or more. The upper limit of the injection pressure is for example, but not particularly defined to, 0.4 MPa. A too high injection pressure causes delamination even in a corner area such as the bottom, leading to difficulty in restoration by pressurized air afterwards. Air may be injected from the fresh air inlet 15 to measure a flow rate of air leaked from the mouth 9.

The type of flowmeter 47 is not particularly limited. For example, the flowmeter 47 configured as in FIG. 16 may be used. The flowmeter 47 has a body 47a provided with a channel 47b having therein a heater 47h, an upstream temperature sensor 47u and a downstream temperature sensor 47d disposed adjacent to both sides of the heater 47h, and an ambient temperature sensor 47r disposed a position away from the heater 47h. The temperature sensors 47u, 47d are disposed in positions at equal distances from the heater 47h on the opposite sides from each other across the heater 47h in an air flow direction AF. The temperatures measured by the temperature sensors 47u, 47d are referred to as Tu and Td, respectively. When the heater 47h is heated, Td−Tu=0 at a flow rate of 0 of the air flowing in the channel 47b and the value of Td−Tu increases at a greater flow rate of the air flowing in the channel 47b. The flow rate of the air flowing in the channel 47b can thus be measured by calculating Td−Tu. The ambient temperature sensor 47r is used for compensation of the gas temperature or the ambient temperature.

In the present embodiment, as illustrated in FIG. 8D, the valve member 5 is mounted to the outer shell 12 with the bridge portion 5b2 in a deflected state, where the biasing force in a direction of pressing the lid 5c against the outer shell 12 is continuously applied to the lid 5c. The fresh air inlet 15 is thus prone to be closed even when the outer shell 12 is not compressed. In the closed state of the fresh air inlet 15, air does not leak out of the fresh air inlet 15 even when the inner bag 14 has a pinhole, causing a problem that determination is made that there is no pinhole even when there is actually a pinhole in the inner bag 14. To eliminate such a problem, the air leakage inspection is preferably performed while a force in a direction of separating the lid 5c from the outer shell 12 is applied to the valve member 5. Specifically, as illustrated in FIGS. 17A-17C, the bridge portion 5b2 is pressed by an edge 47c at the end of the flowmeter 47 to allow the lid 5c away from the outer shell 12 for communication of air through the fresh air inlet 15 and then enable measurement of the air flow rate through the fresh air inlet 15. Air leakage may be detected by placing the end of the flowmeter 47 in sufficiently close vicinity to the fresh air inlet 15, and the end of the flowmeter 47 does not have to be in close contact with the outer shell 12.

Although the air leakage inspection may be performed in any timing after formation of the fresh air inlet 15, the inner bag 14 is possibly damaged in the inner bag separation, the valve member mounting, and the like and thus the inspection is preferably performed after these steps. Although performed prior to the entire circumference preliminary delamination in the present embodiment, the air leakage inspection may be performed after the entire circumference preliminary delamination.

Then, as illustrated in FIG. 13G, the upper tubular portion 41 is cut.

Then, as illustrated in FIGS. 18A-18B, the storage portion 7 of the container body 3 is pressed with a pressing mechanism from outside for compression while the container body 3 is rotated to preliminarily delaminate the inner bag 14 from the outer shell 12 in the entire circumference of the storage portion 7 (entire circumference preliminary delamination). In the present embodiment, the pressing mechanism includes first and second pressing elements 48 and 49, each element having a respective roller 48b or 49b. The storage portion 7 is sandwiched between the rollers 48b and 49b to be pressed. In this state, as illustrated in FIG. 18A, when the container body 3 is rotated in an arrow A direction about a central axis 52, the rollers 48b and 49b are rotated in an arrow B direction respectively about central axes 48a and 49a while pressing the storage portion 7 to preliminarily delaminate the inner bag 14 from the outer shell 12 across the entire circumference of the storage portion 7. The container body 3 and the rollers 48b and 49b may be rotated in the opposite directions to the directions in this embodiment. At least one of the rollers 48b and 49b may be configured not to be rotated by the rotation of the container body 3.

The container body 3 is preferably pressed to compress from 5% to 30% (more preferably from 10% to 20%) of the diameter of the storage portion 7. This is because too little compression may cause difficulty in the entire circumference preliminary delamination and too much compression may cause a recess in the inner bag 14 towards the center of the container body 3 and therefore difficulty in injection of the contents in a later process. When the outer shell 12 is squeezed too much, there is also a problem that the outer shell 12 does not restore its shape after pressing, resulting in a defect as a container.

In the configuration example of FIG. 18A, the container body 3 may be rotated by rotary driving of at least one of the rollers 48b and 49b while the container body 3 is supported rotatably about the central axis 52. As another example, the pressing mechanism may be moved along the outer circumference of the container body 3. A specific configuration example includes, as illustrated in FIG. 19, a configuration where the first and second pressing elements 48 and 49 are coupled with a coupling member 53 to rotate the coupling member 53 about the central axis 52 of the container body 3. In this configuration example, when the coupling member 53 is rotated in the arrow B direction, the first and second pressing elements 48 and 49 rotate in the arrow B direction about the central axes 48a and 49a while moving along the outer circumference of the container body 3 about the central axis 52. In this configuration example, the container body 3 may be rotated or not rotated.

FIG. 20 illustrates still another configuration example of the pressing mechanism. In this configuration example, the pressing mechanism includes first and second pressing elements 48 and 49, each element having a respective belt 48c or 49c. In this configuration example, the entire circumference preliminary delamination is carried out by sandwiching the storage portion 7 between the belts 48c and 49c to press the storage portion 7 for compression while the belt 48c is moved relatively to the belt 49c, thereby transferring, while rotating, the container body 3 in one direction (arrow C direction). The belt 48c is supported by a pair of supporting rods 48e and the belt 49c is supported by a pair of supporting rods 49e. The belt 48c is capable of moving in the arrow C direction by rotary driving of at least one of the supporting rods 48e or separately providing a driving shaft that engages the belt 48c for rotary driving of the driving shaft. The belt 49c may be moved in the arrow C direction at a lower speed than that of the belt 48c, may be configured not to move, or may be moved in the opposite direction to the arrow C at a lower speed than that of the belt 48c. In any case, the container body 3 is transferred in the arrow C direction while rotated with the relative movement between the belts 48c and 49c. Since this configuration example enables continuous processing of many container bodies 3, it is suitable for installation in a production line.

In addition, a support plate 50 may be disposed between the pair of supporting rods 48e and a support plate 51 between the pair of supporting rods 49e. The support plates 50 and 51 are configured to be fixed to a base, not shown, not to deflect easily. Although the storage portion 7 is sometimes not sufficiently pressed in areas away from the supporting rods 48e and 49e due to the deflection of the belts 48c and 49c, the support plates 50 and 51 disposed in the above positions can inhibit the deflection of the belts 48c and 49c to securely press the storage portion 7 for compression. The belts 48c and 49c are preferably provided with projections and depressions on a surface making contact with the storage portion 7. In this case, a gripping force between the storage portion 7 and the belts 48c and 49c increases for more secure rotation of the container body 3 during the transfer.

The entire circumference preliminary delamination may be performed in any timing. Although the air blowing preliminary delamination does not have to be performed prior to the entire circumference preliminary delamination, the air blowing preliminary delamination is preferably performed prior to the entire circumference preliminary delamination because preliminary delamination of the inner bag 14 from the outer shell 12 in a partial region in advance facilitates the entire circumference preliminary delamination with the preliminarily delaminated region as a good starting point. In this case, the entire circumference preliminary delamination may be performed in any timing after the air blowing preliminary delamination. Although the entire circumference preliminary delamination is performed after the valve member mounting in the present embodiment, it may be performed before the valve member mounting.

Then, as illustrated in FIG. 18C, the inner bag 14 is filled with the contents.

Then, as illustrated in FIG. 18D, the cap 23 is mounted on the mouth 9.

Then, as illustrated in FIG. 18E, the storage portion 7 is covered with a shrink film to complete the product.

The order of various procedures described here may be switched appropriately.

Then, working principle of the product thus manufactured in use is described.

As illustrated in FIGS. 21A through 21C, in a state where the product filled with the contents, a side of the outer shell 12 is squeezed for compression to deliver the contents. At the start of use, there is substantially no gap between the inner bag 14 and the outer shell 12, and thus the compressive force applied to the outer shell 12 directly becomes a compressive force to the inner bag 14 and the inner bag 14 is compressed to deliver the contents.

The cap 23 has a built-in check valve, not shown, so that it is capable of delivering the contents in the inner bag 14 but not capable of taking fresh air in the inner bag 14. Therefore, when the compressive force applied to the outer shell 12 is removed after delivery of the contents, the outer shell 12 attempts to be back in the original shape by the restoring force of itself but the inner bag 14 remains deflated and only the outer shell 12 expands. Then, as illustrated in FIG. 21D, inside the intermediate space 21 between the inner bag 14 and the outer shell 12 is in a reduced pressure state to introduce fresh air in the intermediate space 21 through the fresh air inlet 15 formed in the outer shell 12. When the intermediate space 21 is in a reduced pressure state, the lid 5c is not pressed against the fresh air inlet 15 and thus it does not interfere with introduction of fresh air. As illustrated in FIG. 8E, not interfere with introduction of fresh air even if the foundation portions 5b1 of the locking portion 5b make contact with the outer shell 12, the path 5f is provided between the bridge portion 5b2 of the locking portion 5b and the outer shell 12.

Then, as illustrated in FIG. 21E, when the side of the outer shell 12 is again squeezed for compression, the lid 5c closes the fresh air inlet 15 to increase the pressure in the intermediate space 21, and the compressive force applied to the outer shell 12 is transmitted to the inner bag 14 via the intermediate space 21 and the inner bag 14 is compressed by this force to deliver the contents.

Then, as illustrated in FIG. 21F, when the compressive force applied to the outer shell 12 is removed after delivery of the contents, the outer shell 12 is restored in the original shape by the restoring force of itself while fresh air is introduced in the intermediate space 21 from the fresh air inlet 15.

REFERENCE SIGNS LIST

1: Delaminatable Container, 3: Container Body, 5: Valve Member, 7: Storage Portion, 9: Mouth, 11: Outer Layer, 12: Outer Shell, 13: Inner Layer, 14: Inner Bag, 15: Fresh Air Inlet, 21: Intermediate Space, 23: Cap, 27: Bottom Seal Protrusion, 42: Insertion Tool, 44: Robot Arm, 47: Flowmeter, 48, 49: Pressing Element, 50, 51: Support Plate, 53: Coupling Member

The invention claimed is:

1. A method of manufacturing a delaminatable container, comprising:
    forming a container body having an outer shell and an inner bag; and
    preliminarily delaminating the inner bag from the outer shell in an entire circumference of a storage portion of the container body by rotating the container body while pressing the storage portion with a pressing mechanism from outside for compression or by moving the pressing mechanism along an outer circumference of the container body.

2. The method of claim 1, further comprising, preliminarily delaminating the inner bag from the outer shell by blowing air between the outer shell and the inner bag, prior to the preliminary delamination of the entire circumference.

3. The method of claim 1, wherein the pressing mechanism includes first and second pressing elements, each element having a roller, and in the entire circumference preliminary delamination, the storage portion is sandwiched and pressed between the roller of the first pressing element and the roller of the second pressing element.

4. The method of claim 1, wherein the pressing mechanism includes first and second pressing elements, each element having a belt, and for the entire circumference preliminary delamination, the storage portion is sandwiched between the belt of the first pressing element and the belt of the second pressing element to press the storage portion for compression while the belt of the first pressing element is moved relatively to the belt of the second pressing element, thereby transferring the container body in one direction while rotating the body.

5. The method of claim 4, wherein at least one of the belt of the first pressing element and the belt of the second pressing element has a projection and a depression on a surface making contact with the storage portion.

* * * * *